(12) United States Patent
Hafez

(10) Patent No.: US 12,533,196 B2
(45) Date of Patent: Jan. 27, 2026

(54) ROBOTIC SURGICAL SYSTEM WITH A HARNESS ASSEMBLY MOVABLE BETWEEN EXPANDED AND CONTRACTED STATES

(71) Applicant: Mobius Imaging, LLC, Shirley, MA (US)

(72) Inventor: Hisham Hafez, Salem, MA (US)

(73) Assignee: Mobius Imaging, LLC, Shirley, MA (US)

( * ) Notice: Subject to any disclaimer, the term of this patent is extended or adjusted under 35 U.S.C. 154(b) by 356 days.

(21) Appl. No.: 18/229,335

(22) Filed: Aug. 2, 2023

(65) Prior Publication Data

US 2024/0041540 A1    Feb. 8, 2024

Related U.S. Application Data

(60) Provisional application No. 63/370,308, filed on Aug. 3, 2022.

(51) Int. Cl.
    *A61B 34/30* (2016.01)
    *A61B 34/20* (2016.01)
    *A61B 90/00* (2016.01)

(52) U.S. Cl.
    CPC .............. *A61B 34/30* (2016.02); *A61B 34/20* (2016.02); *A61B 90/37* (2016.02); *A61B 2034/305* (2016.02); *A61B 2090/3762* (2016.02)

(58) Field of Classification Search
    CPC ......... A61B 34/70–34/77; A61B 34/30; A61B 34/20; A61B 90/37; A61B 2034/305; A61B 2090/3762; A61B 2034/2048; A61B 2034/2051; A61B 2034/2055; A61B 2034/2059; A61B 2034/2063; A61B 2034/2065; A61B 2090/3983
    See application file for complete search history.

(56) References Cited

U.S. PATENT DOCUMENTS

| 7,725,162 B2 | 5/2010 | Malackowski et al. |
| 8,118,488 B2 | 2/2012 | Gregerson |

(Continued)

FOREIGN PATENT DOCUMENTS

WO    2017066842 A1    4/2017

*Primary Examiner* — Niketa Patel
*Assistant Examiner* — Karmel J Webster
(74) *Attorney, Agent, or Firm* — Howard & Howard Attorneys PLLC

(57) ABSTRACT

A robotic surgical system is provided. The robotic surgical system includes a navigation system and a robotic arm. The robotic arm includes a joint including a proximal joint subassembly supporting a distal joint subassembly for rotation about an axis. The joint also includes a distal joint module attached to the distal joint subassembly and including a distal interface. The robotic arm also includes a proximal joint module attached to the proximal joint subassembly and including a proximal interface. The robotic arm also includes a harness assembly coupled to the proximal interface and to the distal interface, and a spiral region being supported for movement between an expanded state and a contracted state to permit rotation of the distal joint subassembly between a first radial position and a second radial position while maintaining communication between the proximal interface and the distal interface.

19 Claims, 17 Drawing Sheets

(56) References Cited

U.S. PATENT DOCUMENTS

| | | |
|---|---|---|
| 9,008,757 B2 | 4/2015 | Wu |
| 9,111,379 B2 | 8/2015 | Gregerson et al. |
| 9,119,655 B2 | 9/2015 | Bowling et al. |
| 9,801,592 B2 | 10/2017 | Stanton et al. |
| 9,962,132 B2 | 5/2018 | Gregerson |
| 10,151,810 B2 | 12/2018 | Gregerson et al. |
| 10,456,207 B2 | 10/2019 | Flatt |
| 10,959,783 B2 | 3/2021 | Gregerson et al. |
| 11,103,990 B2 | 8/2021 | Sebring et al. |
| 11,160,620 B2 * | 11/2021 | Ebbitt .................... A61B 34/10 |
| 2007/0137371 A1 * | 6/2007 | Devengenzo .......... A61B 34/30 74/490.01 |
| 2014/0275953 A1 | 9/2014 | Gregerson et al. |
| 2020/0078097 A1 | 3/2020 | Gregerson et al. |

\* cited by examiner

ROBOTIC SURGICAL SYSTEM WITH A HARNESS ASSEMBLY MOVABLE BETWEEN EXPANDED AND CONTRACTED STATES

CROSS-REFERENCE TO RELATED APPLICATION

The subject patent application claims priority to and all the benefits of U.S. Provisional Patent Application No. 63/370,308, filed on Aug. 3, 2022, the disclosure of which is hereby incorporated by reference in its entirety.

BACKGROUND

Surgical systems are frequently used to assist medical professionals in carrying out various types of surgical procedures. To this end, a surgeon may use a surgical system to guide, position, move, actuate, or otherwise manipulate various tools, components, prostheses, and the like during a surgery. Surgical systems may include surgical robots which can be used to assist surgeons in performing a number of different types of surgical procedures. By way of illustration, surgical robots are commonly used in procedures involving the correction, stabilization, resection, or replacement of one or more parts of a patient's body, such as to help improve patient mobility, reduce pain, mitigate the risk of subsequent injury or damage, and the like.

Certain types of surgical robots may include a robotic arm that positions a tool above the patient and along a desired trajectory that is aligned with the desired orientation of the tool relative to a surgical site on the patient. By way of illustrative example, in many types of spinal procedures, a robotic arm of a surgical robot positions a tool guide along the desired trajectory that is aligned with the desired orientation of the tool relative to vertebrae and/or discs of the patient's spine. In order to help minimize the overall size and shape of robotic arms, it may be desirable to route electrical connections for power, data, and the like along the robotic arm. However, depending on the specific configuration of the robotic arm, it can be difficult to route electrical connections of these types between joints or other movable portions of the robotic arm without negatively affecting the range of motion of the robotic arm. For example, utilizing wires for electrical connections can present issues relating to tangling or loosening of connections. While other types of electrical connections can be utilized, such as wiper-contact connections, they tend to be expensive, may need routine service, and can be unreliable. Moreover, electrical connections realized with wiper-contact arrangements frequently necessitate custom-manufactured components and special tooling, which tends to increase cost and delay development and manufacturing.

Accordingly, there remains a need in the art for addressing one or more of the deficiencies described above.

SUMMARY

The present disclosure provides a robotic surgical system including a navigation system to track a position and orientation of one or more objects within a coordinate system; and a robotic arm defining an end movable relative to a support structure, with the robotic arm being configured to maintain alignment of the end relative to a target position of a patient's body defined within the coordinate system, the robotic arm including a plurality of joints coupled between the support structure and the end, with one of the joints including: a proximal joint subassembly supporting a distal joint subassembly for rotation about an axis between a first radial position and a second radial position, with a channel defined along the axis and extending in communication between the distal joint subassembly and the proximal joint subassembly; and a distal joint module operatively attached to the distal joint subassembly and including a distal interface. The robotic arm also includes a proximal joint module operatively attached to the proximal joint subassembly and including a proximal interface; and a harness assembly having a first harness end coupled to the proximal interface, a second harness end coupled to the distal interface, and a spiral region extending in communication between the first harness end and the second harness end, the spiral region being supported for movement between an expanded state and a contracted state to permit rotation of the distal joint subassembly about the axis between the first radial position and the second radial position while maintaining communication between the proximal interface and the distal interface across the harness assembly.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION

Figure 1:
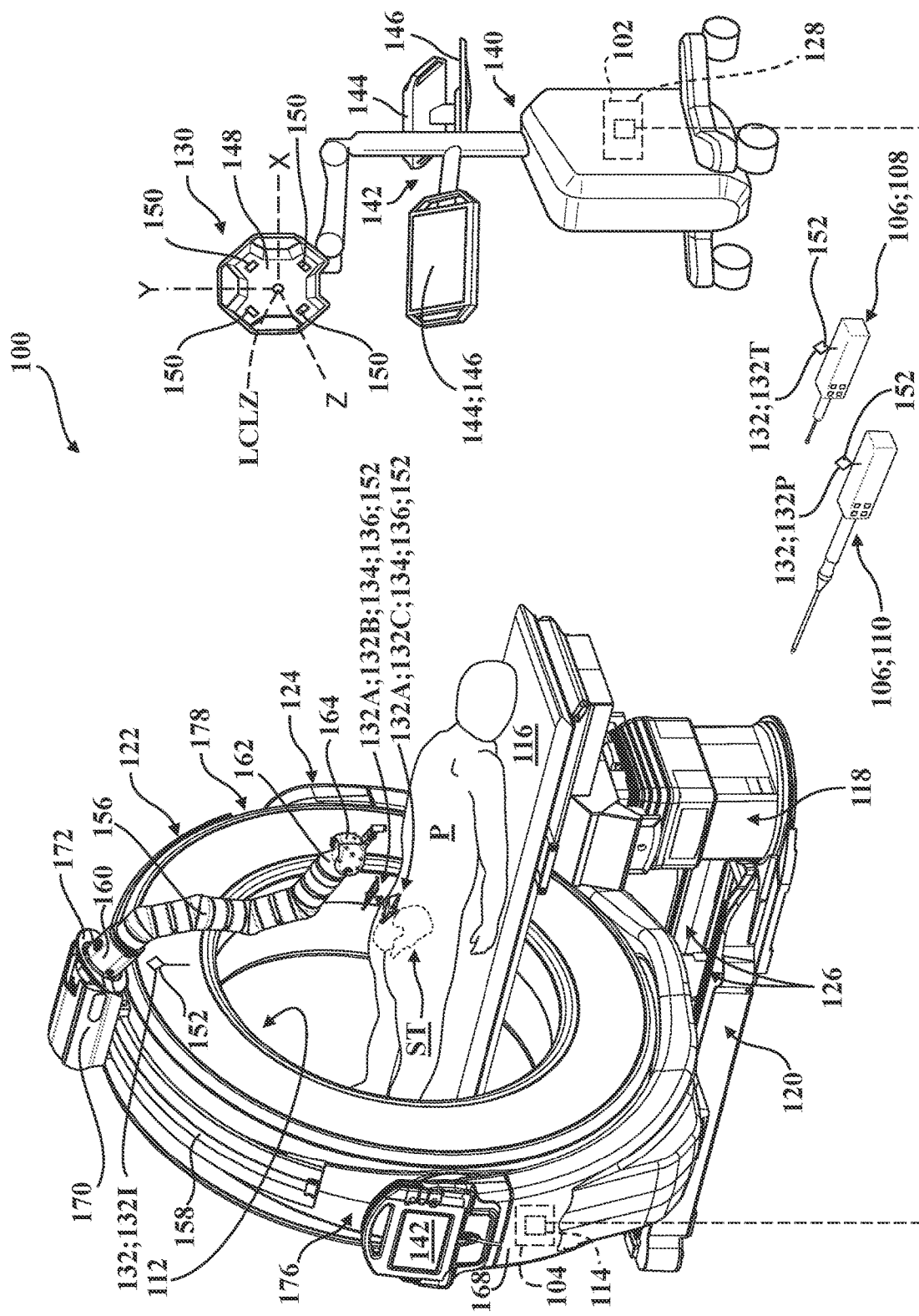
FIG. 1 is a perspective view of the surgical system, including a navigation system including a localizer to track states of trackers within a field of view, a patient tracker adapted for attachment relative to a target site, and a robotic arm configured to maintain alignment of a tool relative to the target site.

Referring now to the drawings, wherein like numerals indicate like or corresponding parts throughout the several views, a surgical system 100 is shown in FIG. 1 for treating a patient P. To this end, the illustrated surgical system 100 generally includes a navigation system 102, an imaging system 104, and one or more types of tools 106. As will be appreciated from the subsequent description below, the surgical system 100 is configured to, among other things, allow the surgeon to visualize, approach, and treat or otherwise manipulate anatomy of a patient P at a target site ST with a high level of control. To this end, imaging data ID of the target site ST may be acquired via the imaging system 104, and can be used to assist the surgeon in visualizing the patient's P anatomy at or otherwise adjacent to the target site ST. Here, the imaging data ID may also be utilized by the navigation system 102 to, among other things, facilitate navigation of tools 106 relative to the target site ST. Each of the components of the surgical system 100 introduced above will be described in greater detail below.

In FIG. 1, an operating room is shown with a patient P undergoing an exemplary surgical procedure performed using the surgical system 100. In this illustrative example, a minimally-invasive spinal surgical procedure, such as a posterior interbody spinal fusion, is being performed. It will be appreciated that this example is illustrative, and that other types of surgical procedures are contemplated. During the surgical procedure, one or more hand-held tools 106, such as a rotary tool 108 and/or a pointer tool 110, may be used by the surgeon. The tool 106 is for engaging the target site ST. As noted above and as is described in greater detail below, the navigation system 102 may be configured to track states of one or more of the tools 106 relative to the target site ST. In this exemplary surgical procedure, the rotary tool 108 may be employed as a cutting or drilling tool to remove tissue, form pilot holes (e.g., in the ilium, in vertebrae, and the like), or otherwise approach the target site ST. The rotary tool 108 may also be used to drive or otherwise install implantable components (e.g., pedicle screws, anchors, and the like).

For illustrative purposes, generically-depicted tools 106 configured for hand-held use are shown in FIG. 1. However, as will be appreciated from the subsequent description below, aspects of the surgical system 100 may be used with any suitable type of tool 106 without departing from the scope of the present disclosure. Furthermore, in addition to hand-held tools 106 of various types and configurations, aspects of the surgical system 100 may also be employed in connection with robotically-controlled tools 106 (not shown). Certain types of robotically-controlled tools 106 are disclosed in U.S. Pat. No. 9,119,655, entitled "Surgical Robotic arm Capable of Controlling a Surgical Instrument in Multiple Modes;" U.S. Pat. No. 10,456,207, entitled "Systems and Tools for use with Surgical Robotic Manipulators;" U.S. Pat. No. 11,160,620, entitled "End Effectors And Methods For Driving Tools Guided By Surgical Robotic Systems;" U.S. Pat. No. 10,959,783, entitled "Integrated Medical Imaging and Surgical Robotic System;" and U.S. Patent Application Publication No. 2020/0078097, entitled "Methods and Systems for Robot-Assisted Surgery," the disclosures of each of which are hereby incorporated by reference in their entirety.

As noted above, the imaging system 104 may be used to obtain imaging tata ID of the patient, which may be a human or animal patient. In the representative version illustrated in FIG. 1, the imaging system 104 is realized as an x-ray computed tomography (CT) imaging device. Here, the patient P may be positioned within a central bore 112 of the imaging system 104 and an x-ray source and detector may be rotated around the central bore 112 to obtain raw x-ray imaging data ID of the patient P. The imaging data ID may be processed using an imaging system controller 114, or another suitable controller, in order to construct three-dimensional imaging data ID, two-dimensional imaging data ID, and the like, which may be transmitted to or otherwise utilized by the navigation system 102 or other components of the surgical system 100.

In some versions, imaging data ID may be obtained preoperatively (e.g., prior to performing a surgical procedure) or intraoperatively (e.g., during a surgical procedure) by positioning the patient P within the central bore 112 of the imaging system 104. In order to obtain imaging data ID, a portion of the imaging system 104 may be moved relative to a patient support 116 (e.g., a surgical table) on which the patient P is disposed while the patient P remains stationary. Here, the patient support 116 is secured to the imaging system 104, such as via a column 118 which is mounted to a base 120 of the imaging system 104. A portion of the imaging system 104 (e.g., an O-shaped imaging gantry 122) which includes at least one imaging component may be supported by an articulable support 124 that can translate along the length of the base 120 on rails 126 to perform an imaging scan of the patient P, and may translate away from the patient P to an out-of-the-way position for performing a surgical procedure on the patient P.

An exemplary imaging system 104 that may be used in various versions is the AIRO® intra-operative CT system manufactured by Mobius Imaging, LLC. Examples of x-ray CT imaging devices that may be used according to various versions of the present disclosure are described in U.S. Pat. No. 10,151,810, entitled "Pivoting Multi-directional X-ray Imaging System with a Pair of Diametrically Opposite Vertical Support Columns Tandemly Movable Along a Stationary Base Support;" U.S. Pat. No. 9,962,132, entitled "Multi-directional X-ray Imaging System with Single Support Column;" U.S. Pat. No. 9,801,592, entitled "Caster System for Mobile Apparatus;" U.S. Pat. No. 9,111,379, entitled "Method and System for X-ray CT Imaging;" U.S. Pat. No. 8,118,488, entitled "Mobile Medical Imaging System and Methods;" and U.S. Patent Application Publication No. 2014/0275953, entitled "Mobile X-ray Imaging System," the disclosures of each of which are hereby incorporated by reference in their entirety.

While the illustrated imaging system 104 is realized as an x-ray CT imaging device as noted above, in other versions, the imaging system 104 may comprise one or more of an x-ray fluoroscopic imaging device, a magnetic resonance (MR) imaging device, a positron emission tomography (PET) imaging device, a single-photon emission computed tomography (SPECT), or an ultrasound imaging device. Other configurations are contemplated. In some versions, the imaging system 104 may be a mobile CT device that is not attached to the patient support 116 and may be wheeled or otherwise moved over the patient P and the patient support 116 to perform a scan. Examples of mobile CT devices include the BodyTom® CT scanner from Samsung Electronics Co., Ltd. and the O-Arm® surgical imaging system form Medtronic, plc. The imaging system 104 may also be a C-arm x-ray fluoroscopy device. In other versions, the imaging system 104 may be a fixed-bore imaging device, and the patient P may be moved into the bore of the device, either on a patient support 116 or on a separate patient table that is configured to slide in and out of the central bore 112. Further, although the imaging system 104 shown in FIG. 1 is located close to the patient P within the operating room, the imaging system 104 may be located remotely, such as in another room or building (e.g., in a hospital radiology department).

The surgical system 100 employs the navigation system 102 to, among other things, track movement of various objects, such as the tools 106 and parts of the patient's P anatomy (e.g., tissue at the surgical site ST), as well as portions of the imaging system 104 in some versions. To this end, the navigation system 102 comprises a navigation controller 128 coupled to a localizer 130 that is configured to track the position and/or orientation of trackers 132 within a localizer coordinate system LCLZ. In other words, the navigation system 102 includes the localizer 130 to track states of trackers 132 within a field of view. As is described in greater detail below, the trackers 132 (also referred to herein as "navigable trackers") are fixed, secured, or otherwise attached to specific objects, and are configured to be monitored by the localizer 130.

The navigation controller 128 is disposed in communication with the localizer 130 and gathers position and/or orientation data for each tracker 132 sensed by the localizer 130 in the localizer coordinate system LCLZ. The navigation controller 128 may be disposed in communication with the imaging system controller 114 (e.g., to receive imaging data ID) and/or in communication with other components of the surgical system 100 (e.g., robotic arm controllers, tool controllers, and the like; not shown). However, other configurations are contemplated. The controllers 114, 128 may be realized as computers, processors, control units, and the like, and may be discrete components, may be integrated, and/or may otherwise share hardware.

It will be appreciated that the localizer 130 can sense the position and/or orientation of multiple trackers 132 to track correspondingly multiple objects within the localizer coordinate system LCLZ. By way of example, and as is depicted in FIG. 1, trackers 132 may comprise a tool tracker 132T, a pointer tracker 132P, an imaging system tracker 132I, one or more patient trackers 132A (e.g., a first patient tracker 132A, a second patient tracker 132B, and the like), a robot tracker 132R, as well as additional patient trackers, trackers for additional medical and/or surgical tools, and the like. The patient tracker 132A is adapted for attachment relative to the target site ST.

Figure 2:
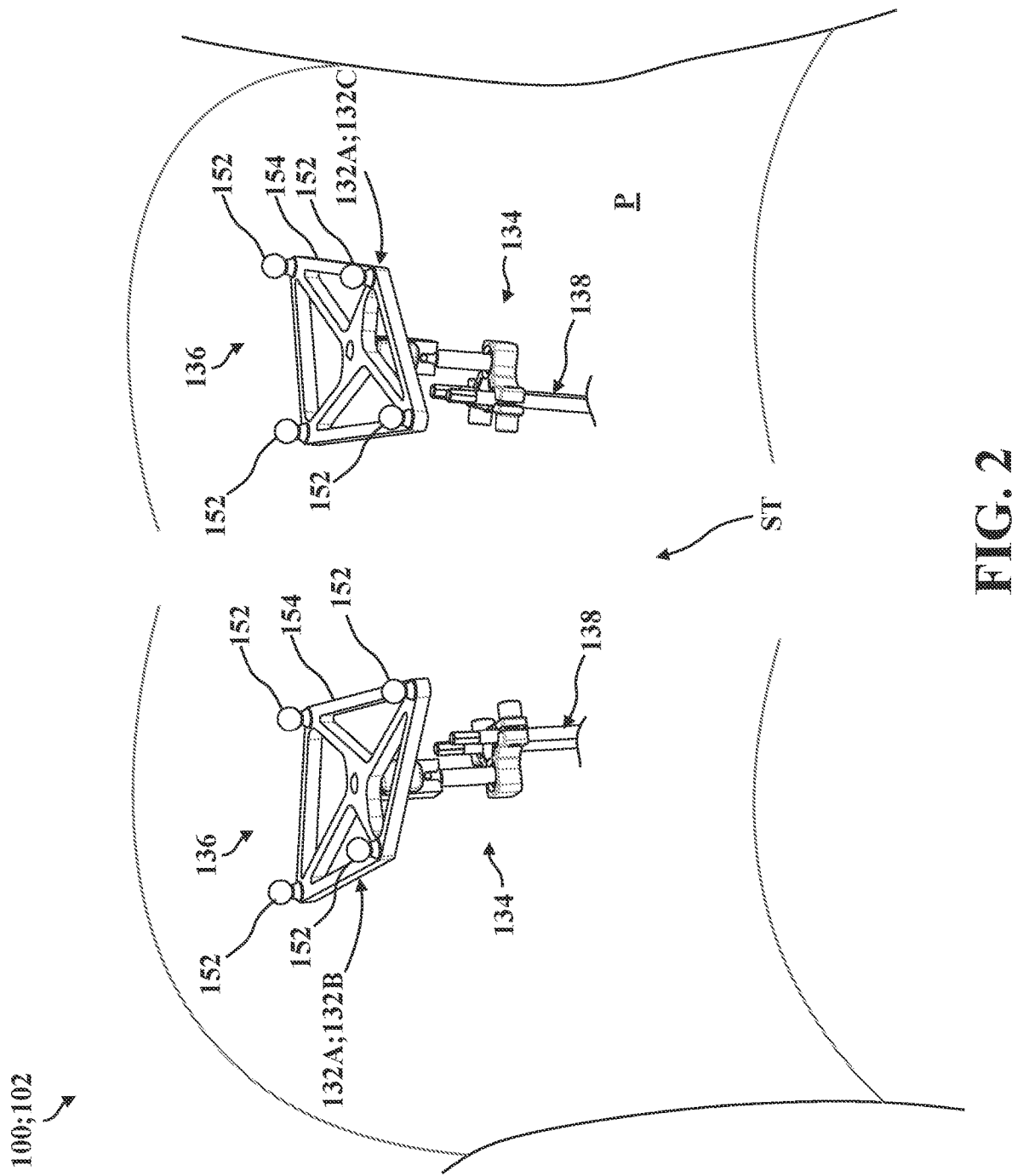
FIG. 2 is a perspective view of the patient tracker attached relative to the target site.

In FIG. 1, the tool tracker 132T, the pointer tracker 132P, and the imaging system tracker 132I are each depicted generically and are shown firmly fixed to (or otherwise integrated with) the rotary tool 108, the pointer tool 110, and the gantry 122 of the imaging system 104, respectively. The first and second patient trackers 132A, 132B, on the other hand, are removably coupled to mount assemblies 134 to define tracker assemblies 136 which facilitate selective movement of the trackers 132A, 132B relative to their mount assemblies 134 according to versions of the present disclosure, as described in greater detail below. As shown in FIG. 2, the tracker assemblies 136 are firmly fixed to different portions of the patient's P anatomy (e.g., to opposing lateral sides of the ilium) via anchors 138 which are configured to releasably engage tissue (e.g., bone). It will be appreciated that trackers 132 may be firmly affixed to different types of tracked objects (e.g., discrete bones, tools, pointers, and the like) in a number of different ways.

The position of the patient trackers 132A, 132B relative to the anatomy of the patient P to which they are attached can be determined by known registration techniques, such as point-based registration in which the pointer tool 110 (to which the pointer tracker 132P is fixed) is used to touch off on bony landmarks on bone, or to touch off on several points across the bone for surface-based registration. Conventional registration techniques can be employed to correlate the pose of the patient trackers 132A, 132B to the patient's anatomy. Other types of registration are also possible.

Position and/or orientation data may be gathered, determined, or otherwise handled by the navigation controller 128 using conventional registration/navigation techniques to determine coordinates of trackers 132 within the localizer coordinate system LCLZ. These coordinates may be utilized by various components of the surgical system 100 (e.g., to facilitate control of the tools 106, to facilitate navigation based on imaging data ID, and the like).

In the representative version illustrated in FIG. 1, the navigation controller 128 and the localizer 130 are supported on a mobile cart 140 which is movable relative to the base 120 of the imaging system 104. The mobile cart 140 also supports a user interface, generally indicated at 142, to facilitate operation of the navigation system 102 by displaying information to, and/or by receiving information from, the surgeon or another user. The user interface 142 may be disposed in communication with other components of the surgical system 100 (e.g., with the imaging system 104), and may comprise one or more output devices 144 (e.g., monitors, indicators, display screens, and the like) to present information to the surgeon (e.g., images, video, data, a graphics, navigable menus, and the like), and one or more input devices 146 (e.g., buttons, touch screens, keyboards, mice, gesture or voice-based input devices, and the like).

In some versions, the surgical system 100 is capable of displaying a virtual representation of the relative positions and orientations of tracked objects to the surgeon or other users of the surgical system 100, such as with images and/or graphical representations of the anatomy of the patient P and the tool 106 presented on one or more output devices 144 (e.g., a display screen). The navigation controller 128 may also utilize the user interface 142 to display instructions or request information from the surgeon or other users of the surgical system 100. Other configurations are contemplated. One type of mobile cart 140 and user interface 142 of this type of navigation system 102 is described in U.S. Pat. No. 7,725,162, entitled "Surgery System," the disclosure of which is hereby incorporated by reference in its entirety.

Because the mobile cart 140 and the gantry 122 of the imaging system 104 can be positioned relative to each other and also relative to the patient P in the representative version illustrated in FIG. 1, the navigation system 102 can transform the coordinates of each tracker 132 from the localizer coordinate system LCLZ into other coordinate systems (e.g., defined by different trackers 132, localizers 130, and the like), or vice versa, so that navigation relative to the target site ST (or control of tools 106) can be based at least partially on the relative positions and orientations of multiple trackers 132 within a common coordinate system (e.g., the localizer coordinate system LCLZ). Coordinates can be transformed using a number of different conventional coordinate system transformation techniques. It will be appreciated that the localizer 130 or other components of the navigation system 102 could be arranged, supported, or otherwise configured in other ways without departing from the scope of the present disclosure. By way of non-limiting example, the localizer 130 could be coupled to the imaging system 104 in some versions (e.g., to the gantry 122). Other configurations are contemplated.

In the illustrated version, the localizer 130 is an optical localizer and includes a camera unit 148 with one or more optical position sensors 150. The navigation system 102 employs the optical position sensors 150 of the camera unit 148 to sense the position and/or orientation of the trackers 132 within the localizer coordinate system LCLZ. To this end, the trackers 132 each employ one or more markers 152 (also referred to as "fiducials" in some versions) that are supported on an array 154 in a predetermined arrangement. However, as will be appreciated from the subsequent description below, trackers 132 may have different configurations, such as with different quantities of markers 152 that can be secured to or otherwise formed in other structures besides the arrays 154 illustrated throughout the drawings (e.g., various types of housings, frames, surfaces, and the like). Other configurations are contemplated.

In some versions, certain trackers 132 (e.g., the patient tracker 132A) may employ "passive" markers 152 (e.g., reflective markers such as spheres, cones, and the like) which reflect emitted light that is sensed by the optical position sensors 150 of the camera unit 148. In some versions, trackers 132 employ "active" markers 152 (e.g., light emitting diodes "LEDs"), which emit light that is sensed by the optical position sensors 150 of the camera unit 148. Examples of navigation systems 102 of these types are described in U.S. Pat. No. 9,008,757, entitled "Navigation System Including Optical and Non-Optical Sensors," the disclosure of which is hereby incorporated by reference in its entirety.

Although one version of the mobile cart 140 and localizer 130 of the navigation system 102 is illustrated in FIG. 1, it will be appreciated that the navigation system 102 may have any other suitable configuration for monitoring trackers 132 which, as will be appreciated from the subsequent description below, may be of various types and configurations and could employ various types of markers 152. Thus, for the purposes of clarity and consistency, the term "marker 152" is used herein to refer to a portion of a tracker 132 (e.g., a passive or active marker 152 mounted to an array 154 or otherwise coupled to a tracked object) that can be monitored by a localizer 130 to track (e.g., states, motion, position, orientation, and the like) of the object to which the tracker 132 is secured, irrespective of the specific type or configuration of the localizer 130 and/or tracker 132.

In some versions, the navigation system 102 and/or the localizer 130 could be radio frequency (RF) based. For example, the navigation system 102 may comprise an RF transceiver coupled to the navigation controller 128. Here, certain trackers 132 may comprise markers 152 realized as RF emitters or transponders, which may be passive or may be actively energized. The RF transceiver transmits an RF tracking signal, and the RF emitters respond with RF signals such that tracked states are communicated to (or interpreted by) the navigation controller 128. The RF signals may be of any suitable frequency. The RF transceiver may be positioned at any suitable location to track the objects using RF signals effectively. Furthermore, it will be appreciated that versions of RF-based navigation systems may have structural configurations that are different than the navigation system 102 illustrated throughout the drawings.

In some versions, the navigation system 102 and/or localizer 130 may be electromagnetically (EM) based. For example, the navigation system 102 may comprise an EM transceiver coupled to the navigation controller 128. Here, certain trackers 132 may comprise markers 152 realized as EM components (e.g., various types of magnetic trackers, electromagnetic trackers, inductive trackers, and the like), which may be passive or may be actively energized. The EM transceiver generates an EM field, and the EM components respond with EM signals such that tracked states are communicated to (or interpreted by) the navigation controller 128. The navigation controller 128 may analyze the received EM signals to associate relative states thereto. Here too, it will be appreciated that versions of EM-based navigation systems may have structural configurations that are different than the navigation system 102 illustrated throughout the drawings.

Those having ordinary skill in the art will appreciate that the navigation system 102 and/or localizer 130 may have any other suitable components or structure not specifically recited herein. Furthermore, any of the techniques, methods, and/or components described above with respect to the camera-based navigation system 102 shown throughout the drawings may be implemented or provided for any of the other versions of the navigation system 102 described herein. For example, the navigation system 102 may also be based on one or more of inertial tracking, ultrasonic tracking, image-based optical tracking (e.g., with markers 152 are defined by patterns, shapes, edges, and the like that can be monitored with a camera), or any combination of tracking techniques. Other configurations are contemplated.

As shown in FIG. 1, the surgical system 100 may include a robotic arm 156 operatively attached to a support element 158 and configured to maintain alignment of the tool 106 relative to the target site ST. The robotic arm 156 may extend between a base end 160 and a mount end 162 arranged for movement relative to the base end 160. The surgical system 100 may further includes an end effector 164 attached to the mount end 162 of the robotic arm 156 and configured to support one or more types of tools 106, instruments, and the like. More specifically, the surgical system 100 may further include a tool guide 166 supported by the end effector 164, and the tool guide 166 may be configured to support the tool 106 relative to a trajectory that is aligned or otherwise determined relative to the surgical site ST on the patient P.

Figure 3:
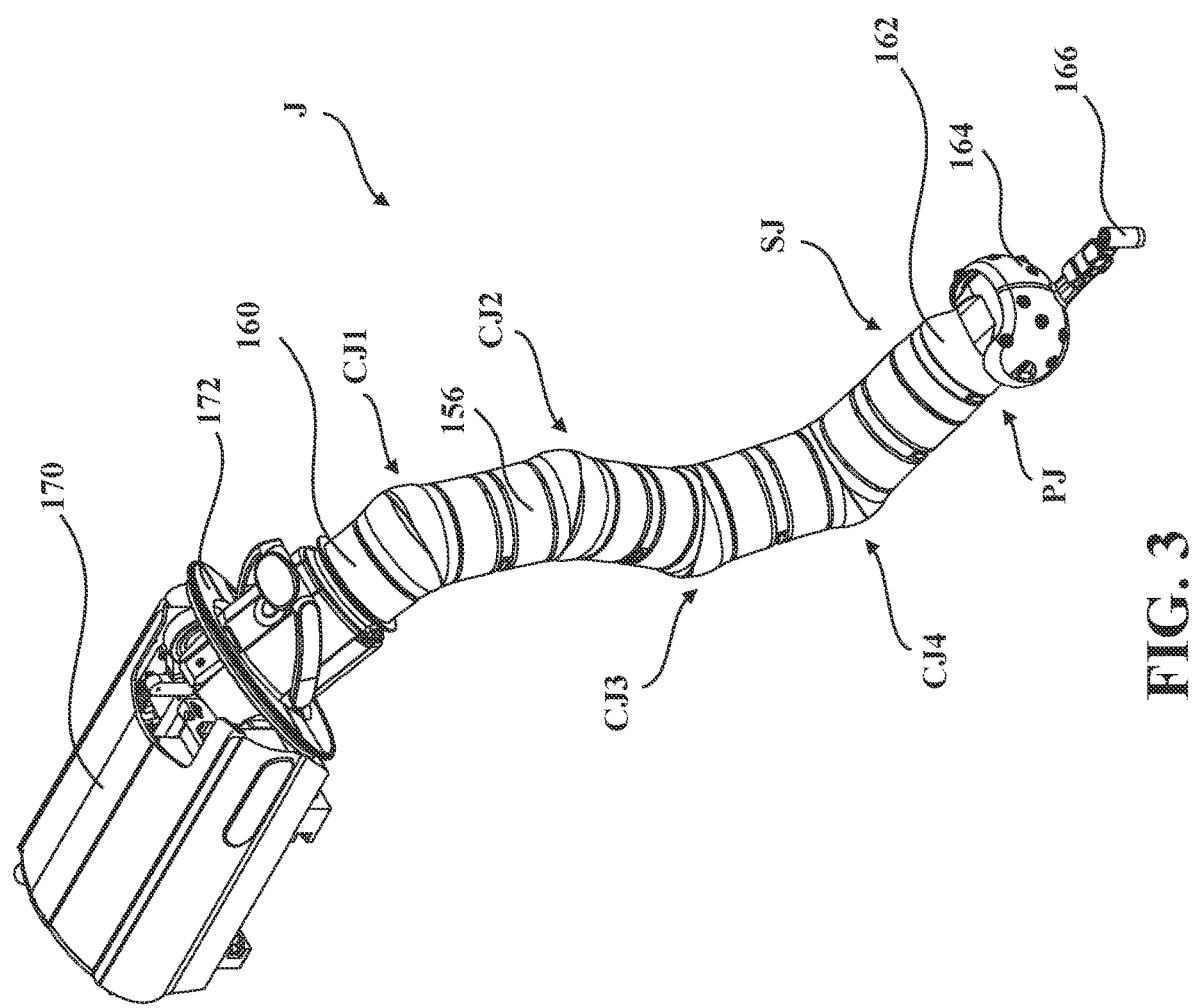
FIG. 3 is a perspective view of the robotic arm of FIG. 1, with the robotic arm extending between a base end and a mount end arranged for movement relative to the base end, with an end effector attached to the mount end of the robotic arm.

Referring to FIG. 3, the robotic arm 156 may comprise a multi-joint arm that includes a plurality of joints J having actuator(s) and optional encoder(s) (not shown in detail) to enable the joints J to bend, rotate and/or translate relative to one another in response to control signals from a robot control system. For example, in the instance illustrated by FIG. 3, the robotic arm 156 includes four Cardan joints CJ1-CJ4, a straight joint SJ, and a perpendicular joint PJ. It should be understood that the robotic arm 156 may include any suitable numbers joint J of various styles, types, and/or configurations. For example, the robotic arm 156 may additionally or alternatively include joints J of a type not shown in FIG. 3. Additionally, the robotic arm 156 may include any suitable arrangement of joints J. For example, the robotic arm 156 may include a straight joint SJ coupled between two Cardan joints CJ. The robotic arm 156 may also include a fewer or greater number of joints J. For example, the robotic arm 156 may include a greater number of Cardan joints CJ to provide the robotic arm 156 greater degrees of freedom. Other configurations are contemplated.

Figure 4:
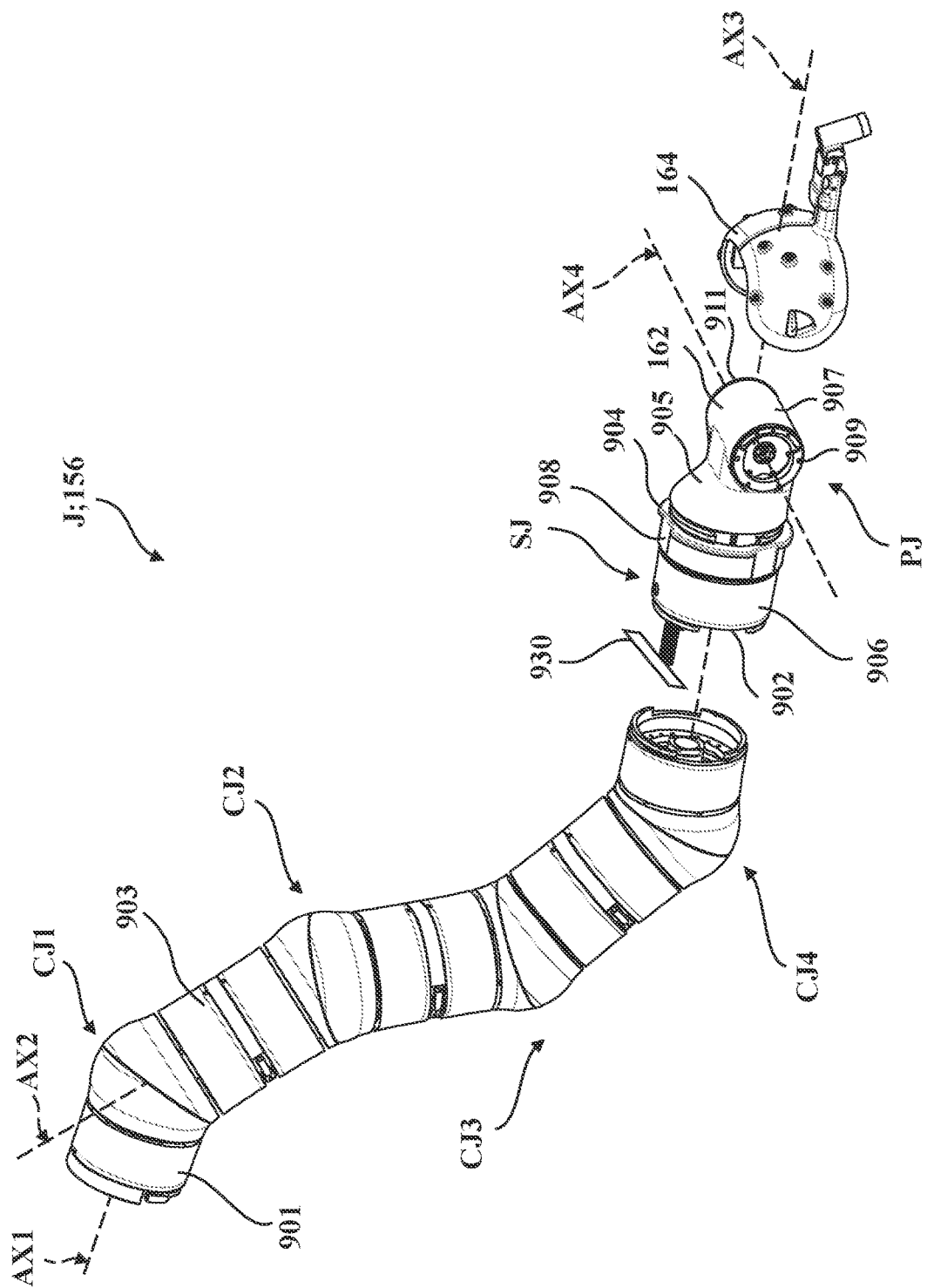
FIG. 4 is an exploded view of the robotic arm of FIG. 1, wherein an end effector, a straight joint, and a perpendicular joint of the robotic arm are illustrated as being separated from the robotic arm.

FIG. 4 further illustrates aspects of the Cardan joints CJ1-CJ4. As shown, each Cardan joint CJ1-CJ4 includes a first member and a second member, the first member 901 and the second member 903 of a first Cardan joint CJ1 being labelled for illustrative purposes. The second member of each Cardan joint CJ1-CJ4 is oriented at an angle relative to the first member. As such, as the first member of a Cardan joint CJ1-CJ4 is supported about a first axis AX1, the second member rotates about a second axis AX2, the second axis being oriented at an angle relative to the first axis AX1. For example, referring to FIG. 4, the second member 903 of the first Cardan joint CJ1 is oriented at an angle of 45 degrees relative to the second member 903 of the first Cardan joint CJ1. As such, as the first member 901 is supported about the axis AX1, the second member 903 rotates about the axis AX2, which is oriented at an angle of 45 degrees relative to the first axis AX1. It will be appreciated that in other instances, the second member of a Cardan joint CJ1-CJ4 may be oriented at any suitable angle relative to the first member of the corresponding Cardan joint CJ1-CJ4. Other configurations are contemplated. In versions where multiple Cardan joints CJ1-CJ4 are utilized and are coupled adjacently to each other, it will be appreciated that the second axis AX2 of one Cardan Joint may define the first axis AX1 of another Cardan Joint supported thereby. In the version illustrated herein, only the first Cardan Joint CJ1 is depicted with its axes labeled, and it will be appreciated that the terms "first axis AX1," "second axis AX2," and so on are utilized herein for non-limiting, illustrative purposes FIG. 4 also depicts the straight joint SJ as noted above. Here, the straight joint SJ includes a proximal joint subassembly 906 and a distal joint subassembly 908. The proximal joint subassembly 906 and the distal joint subassembly 908 are arranged about an axis AX3. Additionally, the proximal joint subassembly 906 is configured to support the distal joint subassembly 908 for rotation about the axis AX3.

FIG. 4 further illustrates the perpendicular joint PJ. Here, the perpendicular joint PJ includes the mount end 162, which includes a base 905 and a cylindrical head 907. The cylindrical head 907 extends along an axis AX4 between a first end 909 and a second end 911. During operation, when the end effector 164 is attached to the mount end 162, the perpendicular joint PJ is configured to rotate the end effector 164 about the axis AX4.

The robotic arm 156 may be fixed to the imaging system 104, such as on the support element 158 (e.g. a curved rail) that may extend concentrically over the outer surface of the O-shaped imaging gantry 122 of the imaging system 104 and that may be located close to the target site ST of the patient P. In some versions, the robotic arm 156 could be coupled to a mobile cart (not shown) or to another type of support element 158 that is not necessarily coupled to the imaging system 104. Although a single robotic arm 156 is shown in FIG. 1, it will be understood that the surgical system 100 may include multiple robotic arms attached to suitable support structure(s). Other configurations are contemplated.

The support element 158 may form a semicircular arc and may be concentric with the outer circumference of the O-shaped imaging gantry 122. The support element 158 may extend around at least 25%, such as between about 30-50% of the outer circumference of the O-shaped imaging gantry 122. The support element 158 may extend around at least a portion of the outer circumference of the O-shaped imaging gantry 122 that is located above the target site ST of the patient P. More specifically, the base end 160 of the robotic arm 156 (e.g., the end of the robotic arm 156 opposite the end effector 164) may be fixed to the support element 158, in a non-limiting example, at a position that is less than about 2 meters, such as less than about 1 meter (e.g., between 0.5 and 1 meter) from the surgical site ST of the patient P during a surgical procedure.

In versions, the support element 158 may extend along a semicircular arc having a radius that is greater than about 33 inches, such as greater than about 35 inches (e.g., between 33 and 50 inches). The support element 158 may be spaced from the outer surface of the O-shaped imaging gantry 122 by a pre-determined distance, which may be from less than an inch (e.g., 0.5 inches) to 6 or 10 inches or more. In some versions, the support element 158 may be spaced from the O-shaped imaging gantry 122 by an amount sufficient to enable the tilt motion of the O-shaped imaging gantry 122 with respect to a gimbal 168 supporting the O-shaped imaging gantry 122 over at least a limited range of motion. Additionally, in some versions, the support element 158 may comprise one or more straight segments (e.g., rail segments), where at least a portion of the support element 158 may extend over the top surface of the O-shaped imaging gantry 122. Other configurations are contemplated.

A carriage 170 may be located on the support element 158 and may include a mounting surface 172 for mounting the base end 160 of the robotic arm 156 to the carriage 170. As shown in FIG. 1, the carriage 170 may extend from the support element 158 towards a first (e.g., front) face of the O-shaped imaging gantry 122. The mounting surface 172 for the robotic arm 156 may extend beyond the first (e.g., front) face of the O-shaped imaging gantry 122 and the robotic arm 156 may extend over the first (e.g., front) face of the O-shaped imaging gantry 122. In some versions, the configuration of the carriage 170 and the mounting surface 172 may be reversed such that the mounting surface 172 extends beyond the second (e.g., rear) face of the O-shaped imaging gantry 122, and the robotic arm 156 may extend over the second (e.g., rear) face of the O-shaped imaging gantry 122. In this configuration, the patient support 116 may be configured such that the patient support 116 and patient P extend into or through the central bore 112 defined through the O-shaped imaging gantry 122, and a portion of the patient P requiring surgical intervention (e.g., the cranium) may be accessed from the second (e.g., rear) side of the imaging gantry 122.

In some versions, the carriage 170 and the robotic arm 156 attached thereto may be moved to different positions along the length of support element 158 (e.g., any arbitrary position between a first end 176 and a second end 178 of the support element 158). The carriage 170 and the robotic arm 156 may be fixed in place at a particular desired position along the length of the support element 158. In some versions, the carriage 170 may be moved manually (e.g., positioned by an operator at a particular location along the length of the support element 158 and then clamped or otherwise fastened in place). Alternately, the carriage 170 may be driven to different positions using a suitable drive mechanism (e.g., a motorized belt drive, friction wheel, gear tooth assembly, cable-pulley system, etc., not shown in detail). The drive mechanism may be located on the carriage 170 and/or the support element 158, for example. An encoder mechanism may be utilized to indicate the position of the carriage 170 and the base end 160 of the robotic arm 156 on the support element 158. Although the version of FIG. 1 illustrates one robotic arm 156 mounted to the support element 158, it will be understood that more than one robotic arm 156 may be mounted to the support element 158 via respective carriages 170.

In some versions, the robotic arm 156 may be mounted directly to the support element 158, such as on a mounting surface 172 that is integrally formed on the support element 158. In such an version, the position of robotic arm 156 may not be movable along the length of the support element 158. In other versions, the robotic arm 156 may be secured to any other portion of the imaging system 104, such as directly mounted to the gantry 122. Alternatively, the robotic arm 156 may be mounted to the patient support 116 or column 118, to any of the wall, ceiling or floor in the operating room, or to a separate cart as noted above. In some versions, the robotic arm 156 may be mounted to a separate mobile shuttle, similar to as is described in U.S. Pat. No. 11,103,990, entitled "System and Method for Mounting a Robotic Arm in a Surgical Robotic System," the disclosure of which is hereby incorporated by reference in its entirety. Although a single robotic arm 156 is shown in FIG. 1, it will be understood that two or more robotic arms 156 may be utilized.

Those having ordinary skill in the art will appreciate that the robotic arm 156 can be employed to aid in the performance of various types of surgical procedures, such as a minimally-invasive spinal surgical procedure or various other types of orthopedic, neurological, cardiothoracic and general surgical procedures. In the version of FIGS. 1 and 2, the robotic arm 156 may be used to assist a surgeon performing a surgical procedure in the lumbar spinal region of a patient. The robotic arm 156 may also be used for thoracic and/or cervical spinal procedures. The procedures may be performed posteriorly, anteriorly or laterally. Other configurations are contemplated.

In some versions, the robotic arm 156 may be controlled to move the end effector 164 to one or more pre-determined positions and/or orientations with respect to a patient P, such as to and/or along a trajectory defined relative to the anatomy of the patient P. As discussed above, the end effector 164 may be realized as or may otherwise support various types of instruments and/or tools 106 including, but not limited to, a needle, a cannula, a dilator, a cutting or gripping instrument, a scalpel, a drill, a screw, a screwdriver, an electrode, an endoscope, an implant, a radiation source, a drug, etc., that may be inserted into the body of the patient P. In some versions, the end effector 164 may be realized as a hollow tube or cannula configured to receive a surgical tool 106, including without limitation a needle, a cannula, a dilator, a cutting or gripping instrument, a scalpel, a drill, a screw, a screwdriver, an electrode, an endoscope, an implant, a radiation source, a drug, and the like. The surgical tool 106 may be inserted into or otherwise adjacent to the patient's body through the hollow tube or cannula by a surgeon. The robotic arm 156 may be controlled to maintain the position and orientation of the end effector 164 with respect to the patient P to ensure that the surgical tool(s) 106 follow a desired trajectory through the patient's body to reach the target site ST. The target site ST may be determined preoperatively and/or intraoperatively, such as during a surgical planning process, based on patient images which may be obtained using the imaging system 104.

In the representative version illustrated herein, the navigation system 102 tracks the robotic arm 156 within the localizer coordinate system LCLZ via the robot tracker 132R, as is described in greater detail below. To this end, a control loop may continuously read the tracking data and current parameters (e.g., joint parameters) of the robotic arm 156, and may send instructions to the navigation controller 128 and/or to the imaging system controller 114 (and/or some other controller, such as a robot controller) to cause the robotic arm 156 to move to a desired position and orientation within the localizer coordinate system LCLZ.

In some versions, a surgeon may use one or more portions of the surgical system 100 as a planning tool for a surgical procedure, such as by setting trajectories within the patient for inserting tools 106, as well as by selecting one or more target sites ST for a surgical intervention within the patient's body. The trajectories and/or target sites ST set by the surgeon may be saved (e.g., in a memory of a computer device) for later use during surgery. In some versions, the surgeon may be able to select stored trajectories and/or target sites ST using the surgical system 100, and the robotic arm 156 may be controlled to perform a particular movement based on the selected trajectory and/or target site ST. For example, the robotic arm 156 may be moved to position the end effector 164 of the robotic arm 156 into alignment with the pre-defined trajectory and/or over the pre-determined target site ST. As discussed above, the end effector 164 may include the tool guide 166 which may be used to guide the tool 106 relative to the patient's body along the pre-defined trajectory and/or to the pre-defined target site ST.

As discussed above, the localizer 130 may include a camera unit 148 with one or more optical position sensors 150. More specifically, the optical position sensors 150 may be light sensors capable of sensing changes in infrared (IR) emitted within a field of view. In some versions, the localizer 130 may include one or more radiation sources (e.g., one or more diode rings) that direct radiation (e.g., IR radiation) into the surgical field, where the radiation may be reflected by the markers 152 and received by the cameras. In the illustrated version, certain active markers 152 (e.g., active markers 152 which define the robot tracker 132R) are configured to emit IR light detectable by the optical position sensors 150 of the localizer 130. The navigation controller 128 may be coupled to the localizer 130 and may determine the positions and/or orientations of markers 152 detected by the optical position sensors 150 using, for example, triangulation and/or transformation techniques. A 3D model and/or mathematical simulation of the surgical space may be generated and continually updated using motion tracking software implemented by the navigation controller 128.

As previously stated, the robotic arm 156 may comprise a multi-joint arm that includes a plurality of joints J being configured to bend, rotate, and/or translate relative to one another. As shown in FIG. 3, the robotic arm 156 includes Cardan joints J1-J4, a straight joint SJ, and a perpendicular joint PJ. While of the present disclosure are illustrated and described in connection with the proximal joint subassembly 906 and the distal joint subassembly 908 of the straight joint SJ in greater detail below, those having ordinary skill in the art will appreciate that the aspects of the present disclosure could be utilized with other types of joints J (e.g., perpendicular joints, Cardan joints, and the like).

Figure 5:
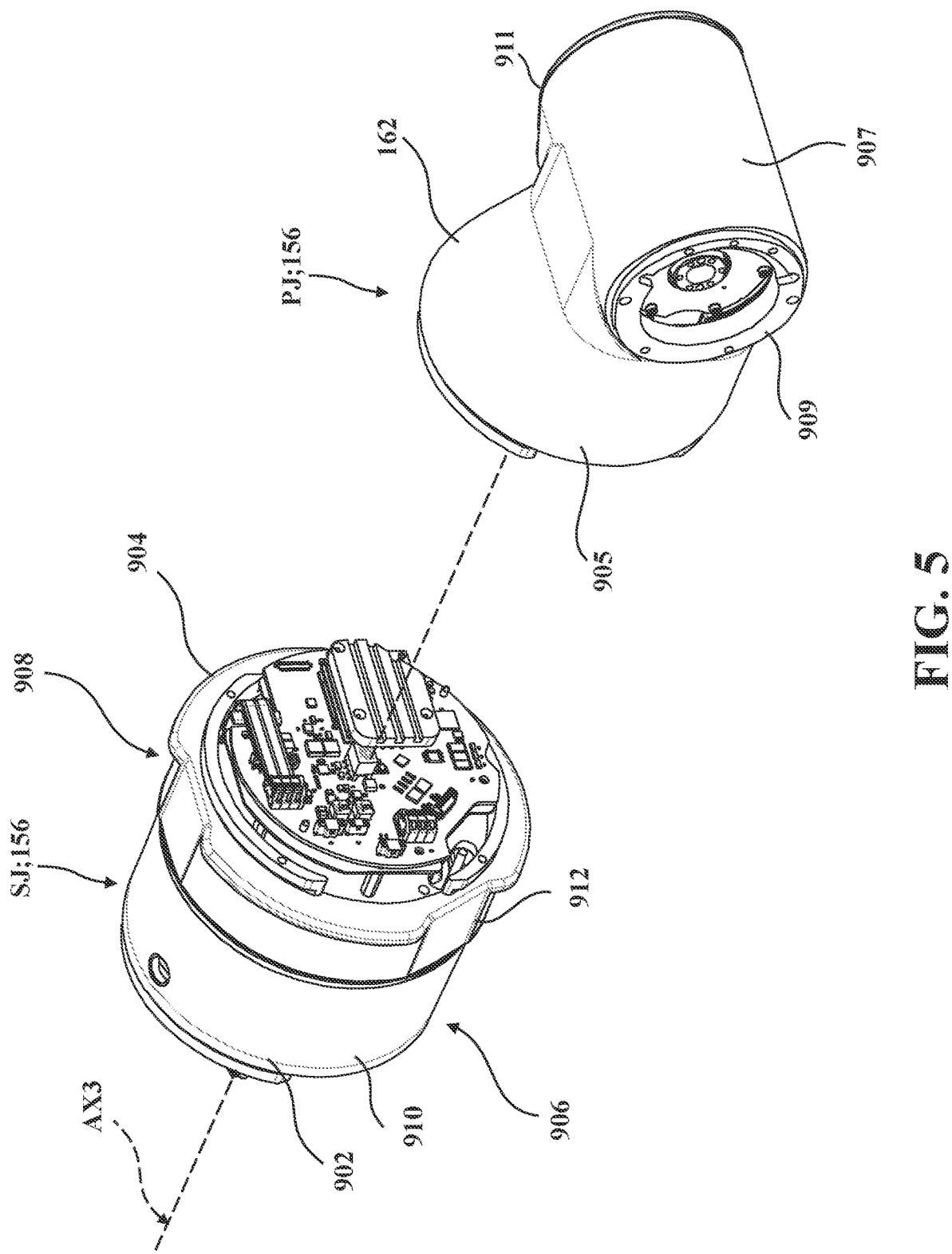
FIG. 5 is an exploded view of the straight joint and the perpendicular joint of FIG. 4, wherein the perpendicular joint is illustrated as being separated from the straight joint.

As previously described, and as further shown in FIG. 5, the straight joint SJ includes the proximal joint subassembly 906 and the distal joint subassembly 908. As is described in greater detail below, a channel CH is defined along the axis AX3 and extends in communication between the distal joint subassembly 908 and the proximal joint subassembly 906.

The proximal joint subassembly 906 is configured to support the distal joint subassembly 908 for rotation about the axis AX3. Also shown, the proximal joint subassembly 906 includes a proximal joint subassembly housing 910 and the distal joint subassembly 908 includes a distal joint subassembly housing 912.

Figure 6A:
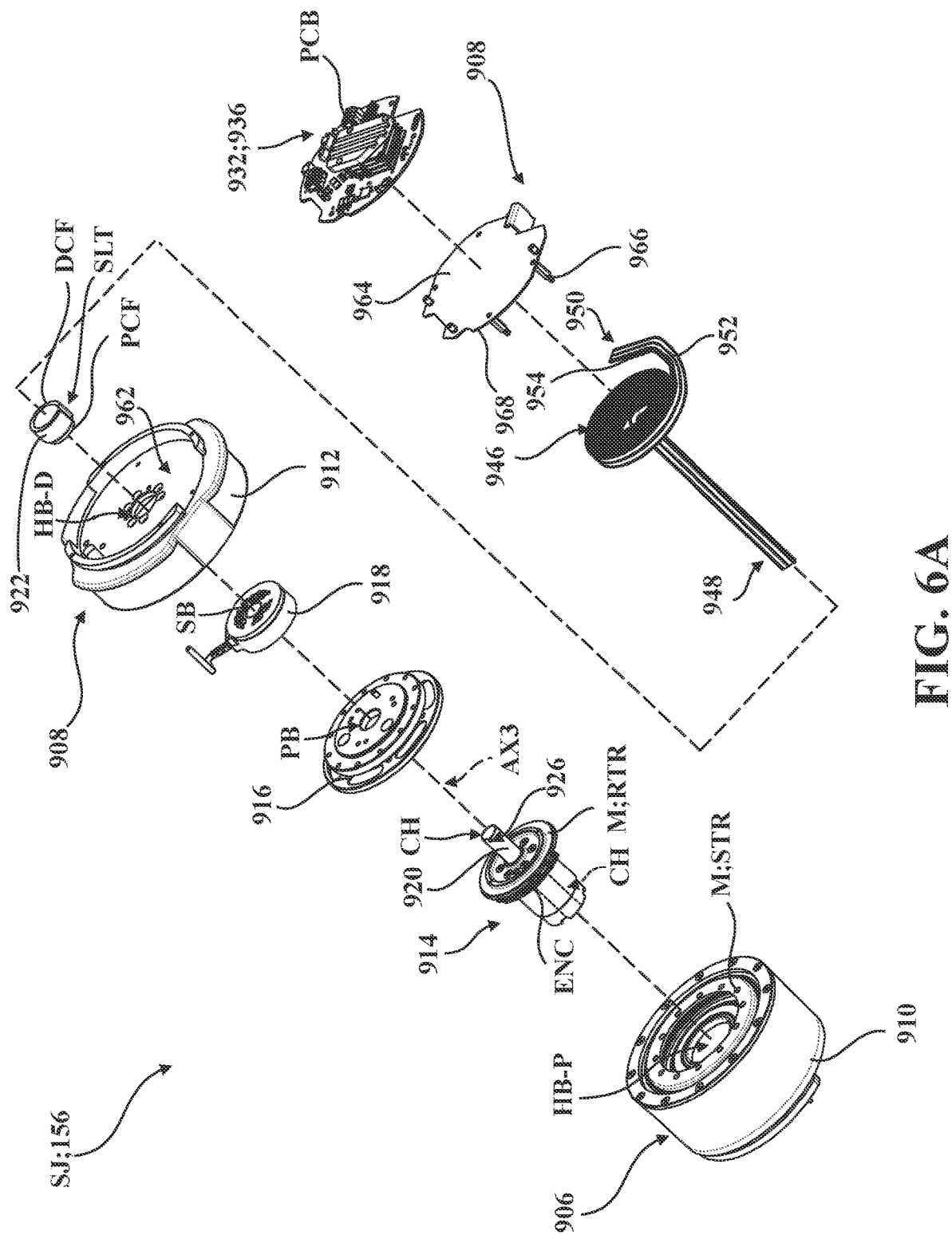
FIGS. 6A and 6B are exploded views of the straight joint of FIG. 4, wherein a proximal joint subassembly, a rotor subassembly, an intermediate plate, a force/torque sensor, a distal joint subassembly, a tube cap, a harness assembly, a riser mount, and a distal joint module of the straight joint are illustrated.
Figure 6B:
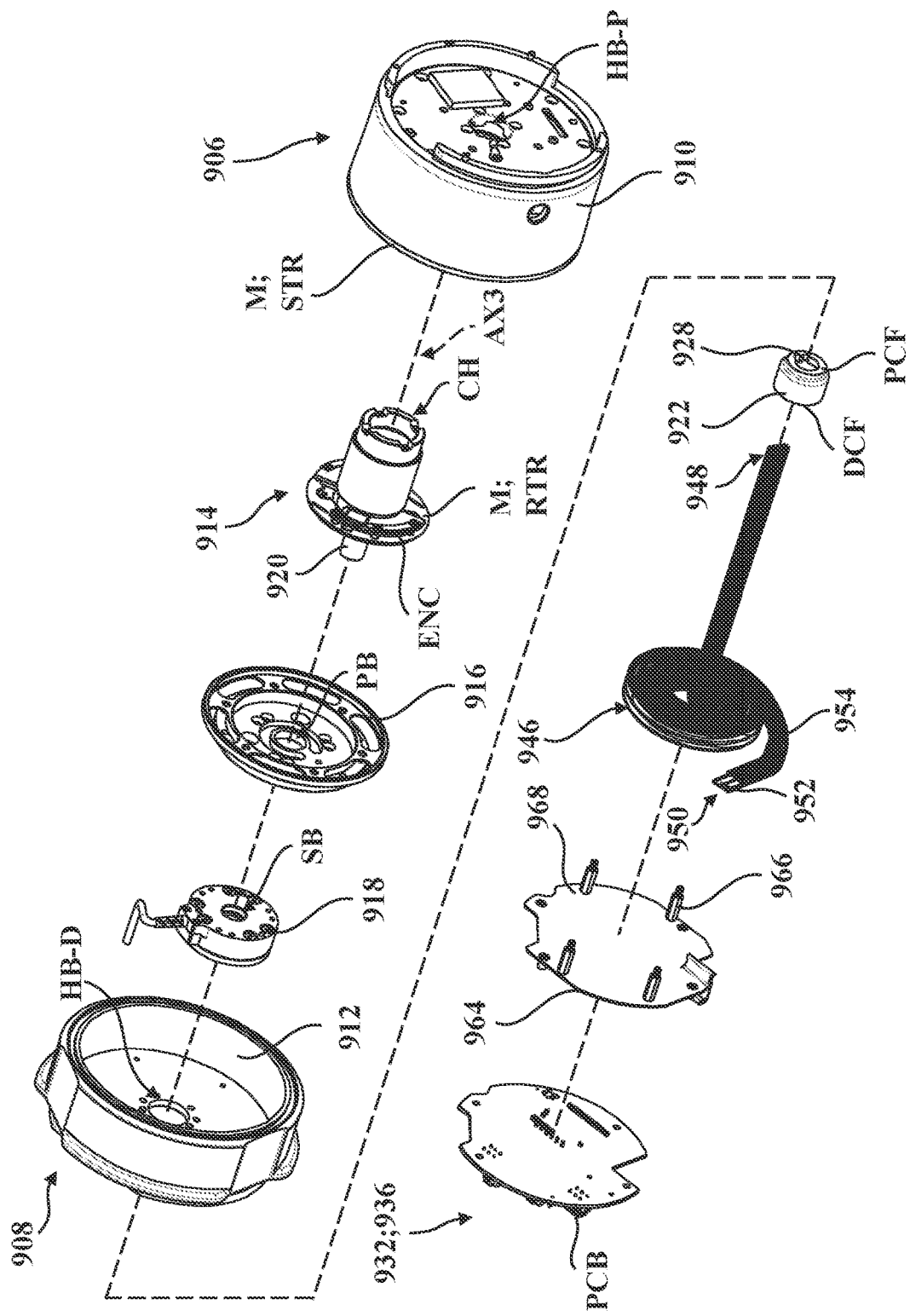

As shown in FIGS. 6A and 6B, the straight joint SJ also includes a rotor subassembly 914, an intermediate plate 916, a force/torque sensor 918, and a motor M. The force/torque sensor 918 is configured to sense changes in force and/or torque acting between the intermediate plate 916 and the distal joint subassembly housing 912. The motor M includes a stator STR and a rotor RTR. The stator STR (see FIG. 6A) is supported for rotation relative to the proximal joint subassembly housing 910, and the rotor RTR is formed as a part of the rotor subassembly 914. Here, while not shown in detail, the rotor RTR and the other portions of the rotor subassembly 914 are operatively attached to the proximal joint subassembly housing 910, while the intermediate plate 916 is operatively attached to the stator STR which, in turn, is rotatably supported by the proximal joint subassembly housing 910. The force/torque sensor 918 and the distal joint subassembly housing 912 are operatively attached to the intermediate plate 916 to effect rotation of the distal joint subassembly 908 relative to the proximal joint subassembly 906 about the axis AX3 via operation of the motor M.

Figure 7A:
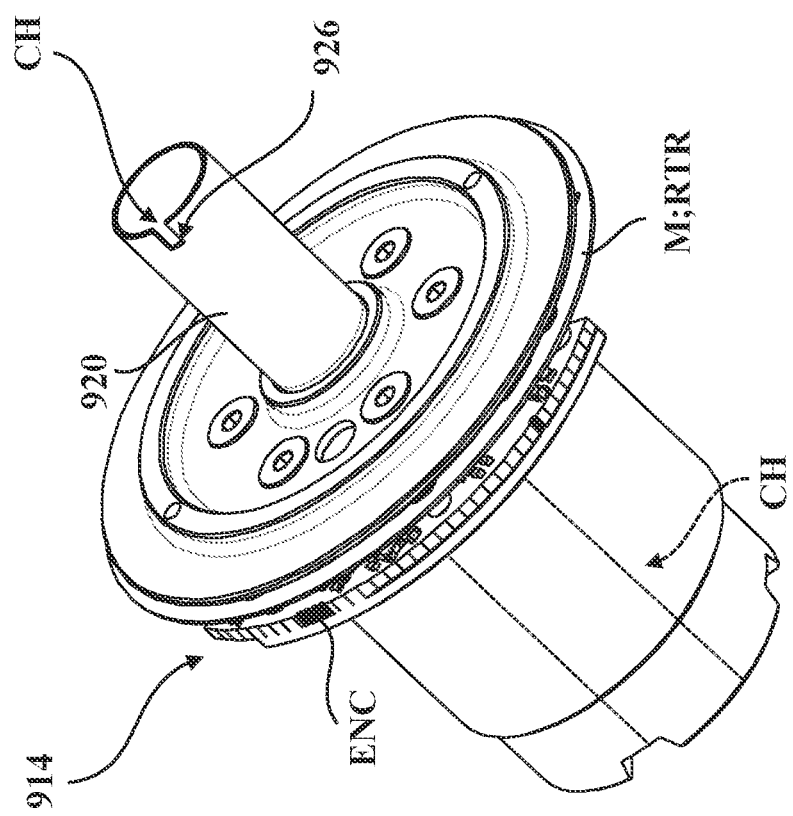
FIGS. 7A and 7B are perspective views of the rotor subassembly of FIGS. 6A and 6B and the tube cap of FIGS. 6A and 6B.
Figure 7B:
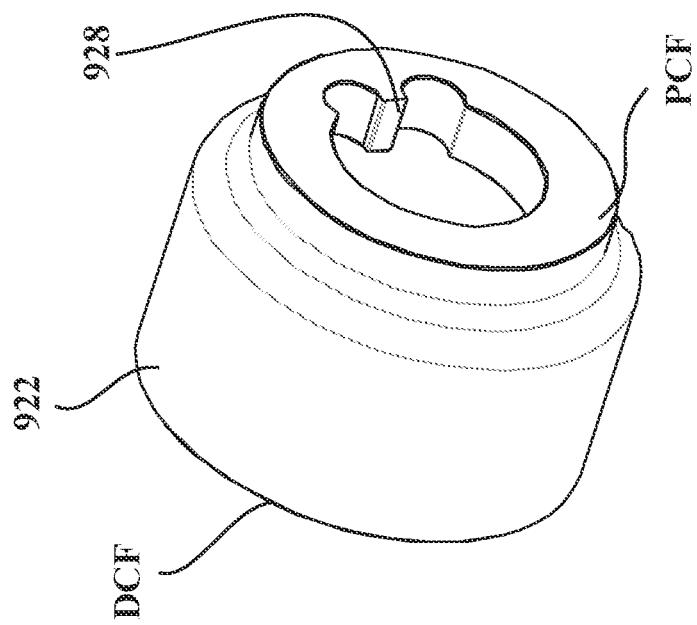

As shown in FIGS. 6A and 6B, the rotor subassembly 914 includes a tube 920 which, among other things, extends along the axis AX3 towards the distal joint subassembly 908. Here, portions of the intermediate plate 916, the force/torque sensor 918, and the distal joint subassembly housing 912 are disposed along the tube 920. To this end, the intermediate plate 916 defines a plate bore PB, the force/torque sensor 918 defines a sensor bore SB, and the distal joint subassembly housing 912 defines a housing bore HB-D, with portions of the tube 920 extending through the plate bore PB, the sensor bore SB, and the housing bore HB-D. A tube cap 922 is coupled to a distal end of the tube 920. Here, the tube 920 of the rotor subassembly 914 defines a notch 926 (see: FIG. 6A and FIG. 7A), and the tube cap 922 defines a tooth 928 (see: FIGS. 6B and 7B) shaped to be received in the notch 926 to couple the tube cap 922 to the rotor subassembly 914. As shown in FIGS. 6A, 6B, and 7B, the tube cap 922 includes a distal cap face DCF and a proximal cap face PCF.

As shown in FIG. 6A, the rotor subassembly 914 is configured to be received by a housing bore HB-P defined by the proximal joint subassembly housing 910. Specifically, the rotor subassembly 914 is configured to be received by a housing bore HB-P such that the rotor subassembly 914 may rotate within the housing bore HB-P. The rotor subassembly 914 is configured to rotate relative to the proximal joint subassembly housing 910 about the axis AX3 and, similarly, the rotor RTR is configured to rotate relative to the stator STR about the axis AX3. As the rotor subassembly 914 is coupled to the distal joint subassembly 908, the motor is configured to rotate the distal joint subassembly 908 about the axis AX3.

The rotor subassembly 914 includes an encoder ENC. As shown in FIG. 6A, the encoder ENC is coupled to the rotor RTR and is configured to determine the arrangement of the rotor RTR relative to the stator STR. Here, the encoder ENC can also be utilized to determine the rotational position of the distal joint subassembly 908 relative to the proximal joint subassembly 906 about the axis AX3.

Figure 8:
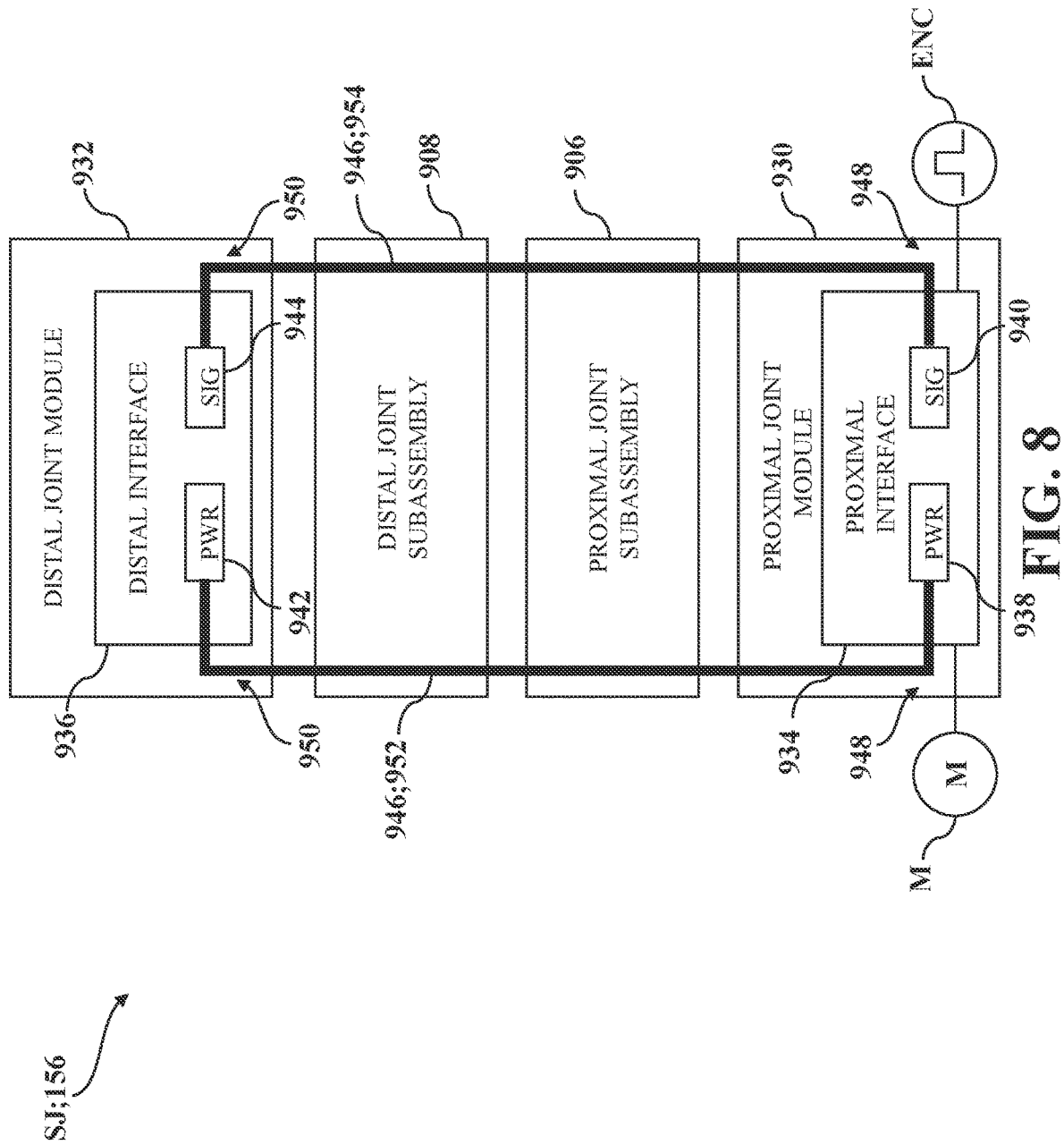
FIG. 8 is a diagrammatic view of the distal-most joint of FIG. 4, wherein the straight joint of FIGS. 6A and 6B, a distal interface, the distal joint subassembly of FIGS. 6A and 6B, the proximal joint subassembly of FIGS. 6A and 6B, a proximal joint module, and a proximal interface are shown.

Referring back to FIG. 4, the robotic arm 156 includes a proximal joint module 930, which may be operatively attached to the proximal joint subassembly 906 or to another portion of the robotic arm (not shown in detail). It will be appreciated that any suitable component of the robotic arm 156 may include the proximal joint module 930. For example, in some instances one of the Cardan joints CJ1-CJ4 may include the proximal joint module 930. Similarly, the proximal joint module 930 may be adjacent to the base end 160 of the robotic arm 156 in some versions. Other configurations are contemplated. As shown in FIGS. 6A and 6B, the straight joint SJ includes a distal joint module 932, which is operatively attached to the distal joint subassembly 908 as described in greater detail below. Here too, it will be appreciated that various configurations are contemplated, and that the distal joint module 932 and the proximal joint module 930 could be arranged on different sides of any suitable type of joint J of the robotic arm 156. As shown in FIG. 8, the proximal joint module 930 includes a proximal interface 934 and the distal joint module 932 includes a distal interface 936. Additionally, the proximal interface 934 includes a power connection interface 938 and a signal connection interface 940, and the distal interface 936 includes a power connection interface 942 and a signal connection interface 944.

Figure 9:
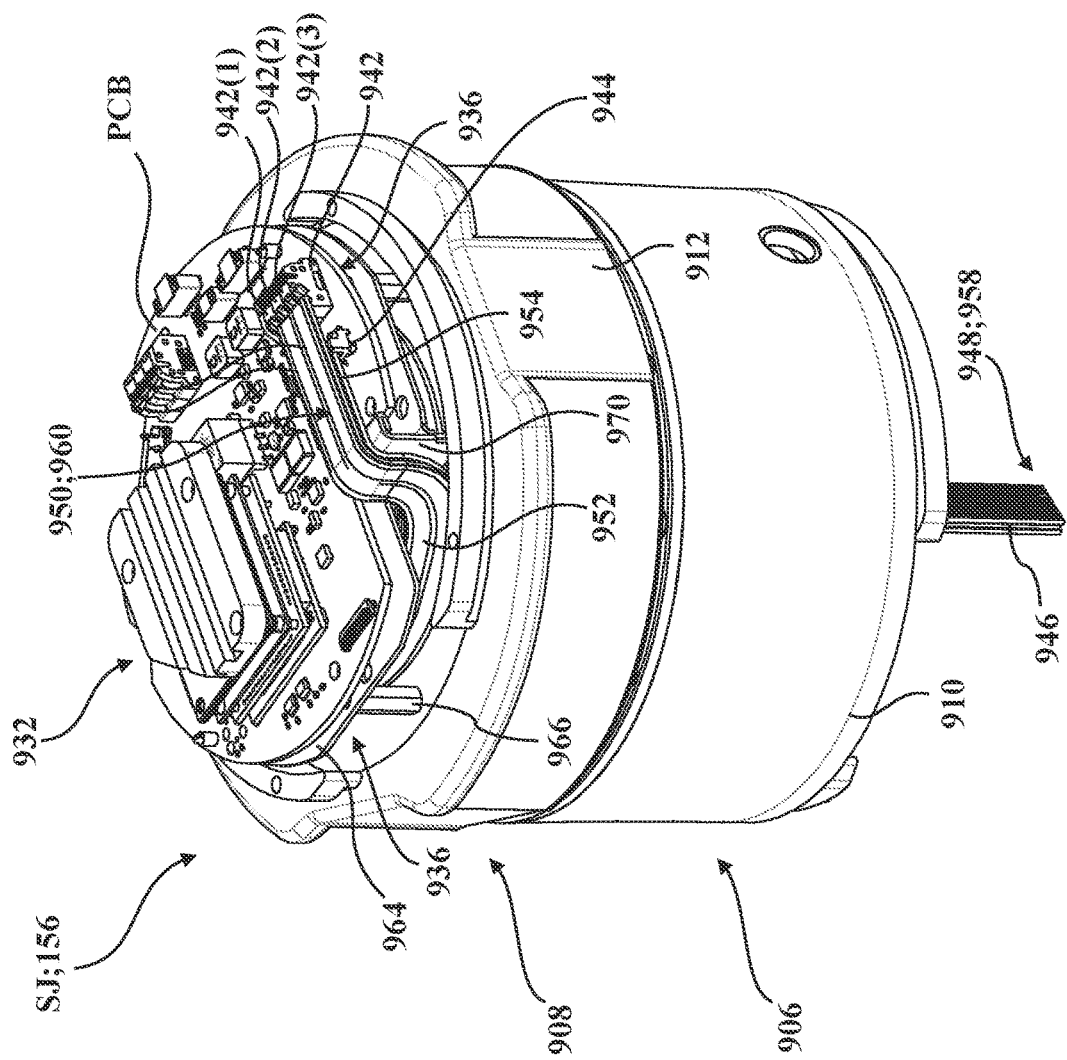
FIG. 9 is a perspective view of the straight joint of FIG. 4, wherein a printed-circuit board, the distal joint subassembly of FIGS. 6A and 6B, and the proximal joint subassembly of FIGS. 6A and 6B are illustrated.

The distal joint module 932 and the distal interface 936 are further shown in FIG. 9. In some versions, the robotic arm 156 may include a printed circuit board PCB coupled to the distal joint subassembly 908. The printed circuit board PCB may be coupled to and/or house the power connection interface 938 and/or the signal connection interface 940 of the distal interface 936. For example, in the instances illustrated herein, the printed circuit board PCB includes the distal interface 936 such that the power connection interface 938 and the signal connection interface 940 are located on the printed circuit board PCB. It will be appreciated that the distal interface 936 and, more specifically, the power connection interface 938 and the signal connection interface 940, may be located at any suitable location on the printed circuit board PCB. While not shown in detail, it will be appreciated that a separate printed circuit board PCB may be coupled to and/or house the power connection interface 942 and/or the signal connection interface 944 of the proximal interface 934.

Figure 10:
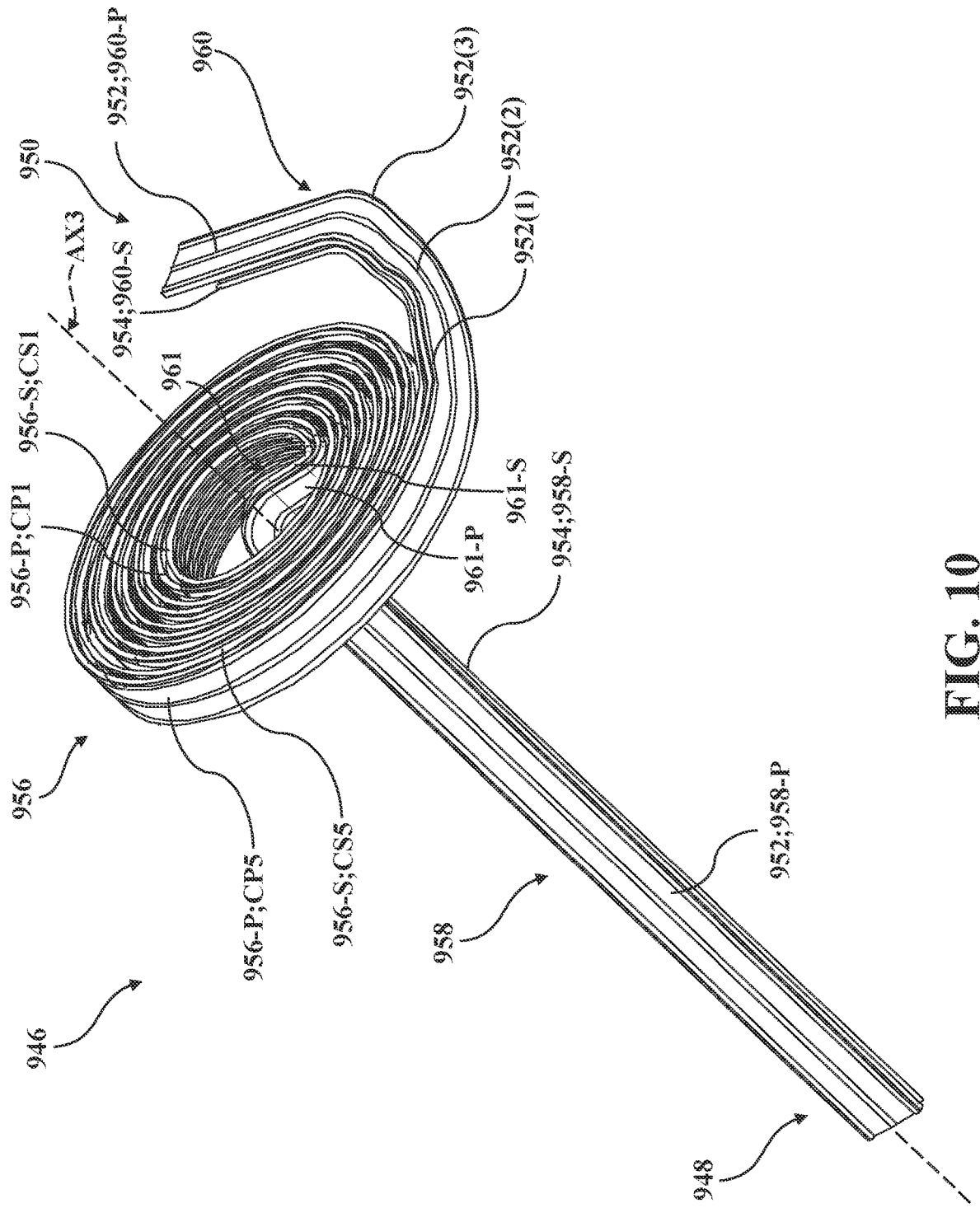
FIG. 10 is a perspective view of the harness assembly of FIGS. 6A and 6B.
Figure 11:
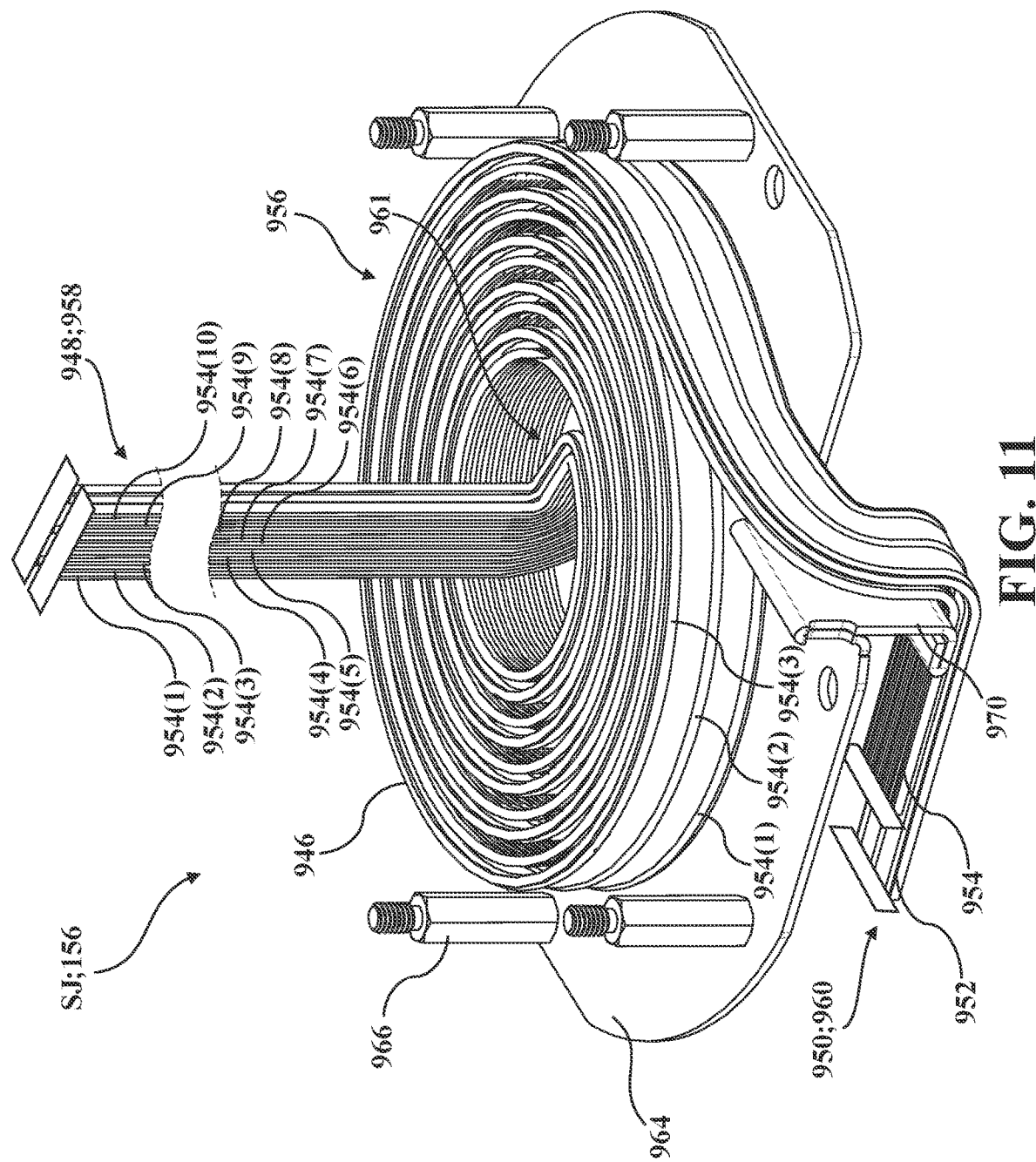
FIG. 11 is a partial perspective view of the harness assembly of FIGS. 6A and 6B and the riser mount of FIGS. 6A and 6B.

Referring back to FIG. 6A, the robotic arm 156 includes a harness assembly 946 according to the present disclosure. As shown, the harness assembly 946 includes a first harness end 948 and a second harness end 950. Additionally, in the illustrated version, the harness assembly 946 includes a power harness 952 for transmitting power, and a signal harness 954 for transmitting data. However, it will be appreciated that other quantities of harnesses could be utilized with or otherwise defined by the harness assembly 946. In the illustrated versions, the harness assembly 946 includes one or more wires 952, 954 extending in electrical communication between the proximal interface 934 and the distal interface 936. Referring to FIG. 10, the illustrated power harness 952 includes three individual power wires 952(1)-952(3). Referring to FIG. 11, the illustrated signal harness 954 includes ten individual signal wires 954(1)-954(10). However, it will be appreciated that other quantities of wires 952, 953 could be employed. Moreover, while the illustrated versions depicts the harness assembly 946 with the power harness 952 and the signal harness 954 each configured for electrical communication, it will be appreciated that other versions are contemplated. By way of non-limiting example, in some versions, one or more portions of the harness assembly 946 could be configured to facilitate other types of communication between the proximal interface 934 and the distal interface 936, such as optical communication.

Referring to FIG. 8, the first harness end 948 is configured to be coupled to the proximal interface 934 of the proximal joint module 930 and the second harness end 950 is configured to be coupled to the distal interface 936 of the distal joint module 932. Additionally, the power harness 952 is coupled to the power connection interface 938 of the proximal interface 934 and to the power connection interface 942 of the distal interface 936. The signal harness 954 is coupled to the signal connection interface 940 of the proximal interface 934 and to the signal connection interface 944 of the distal interface 936. In this way, the harness assembly 946 transmits power and data between the proximal interface 934 and the distal interface 936.

Referring to FIG. 9, the power harness 952 is shown coupled to the power connection interface 942 of the distal interface 936 and the signal harness 954 is shown coupled to the signal connection interface 944 of the distal interface 936. In the instance of FIG. 9, the power connection interface 942 includes three power connections 942(1)-942(3), each power connections 942(1)-942(3) being coupled to a power wire 952(1)-952(3) when the power harness 952 is coupled to the power connection interface 942. Similarly, in the instance of FIG. 9, the signal connection interface 944 includes ten signal connections, each signal connection being coupled to a signal wire 954(1)-954(10) when the signal harness 954 is coupled to the signal connection interface 944. However, it will be appreciated that different quantities of power connections and/or signal connections are contemplated by the present disclosure.

In some instances, such as the instance of FIG. 8, the motor M may be coupled to the power harness 952, either directly or indirectly, to rotating the distal joint subassembly 908 relative to the proximal joint subassembly 906. Additionally, the encoder ENC may be coupled to the signal harness 954, either directly or indirectly, to sense a position of the distal joint subassembly 908 and transmit the position of the distal joint subassembly 908 via the signal harness 954. Other configurations are contemplated.

Figure 12A:
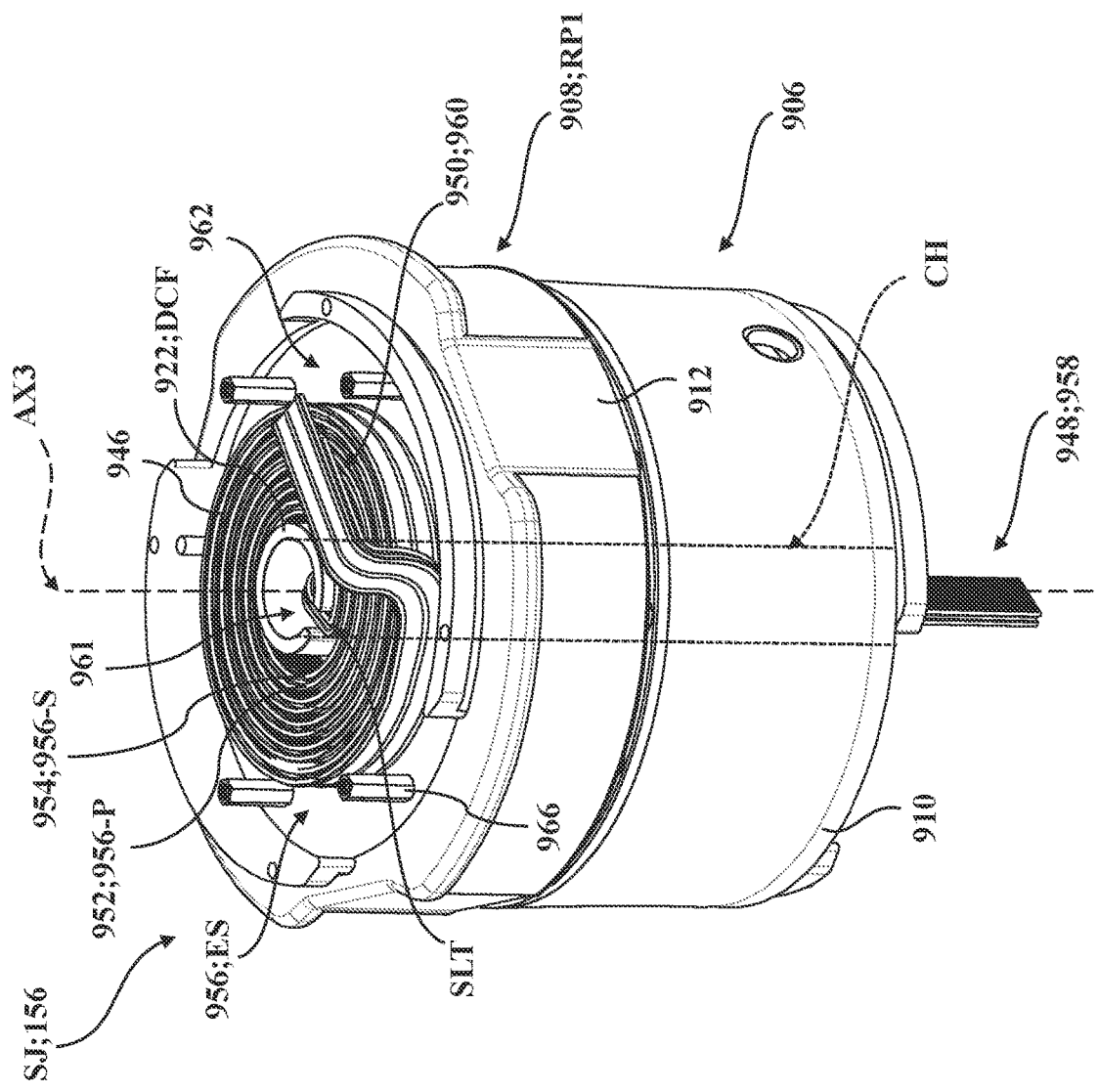
FIG. 12A is a perspective view of the straight joint as shown in FIG. 9, wherein the distal joint subassembly of FIGS. 6A and 6B is shown in a first rotational position, and wherein the printed-circuit board of FIG. 9 is removed.
Figure 12B:
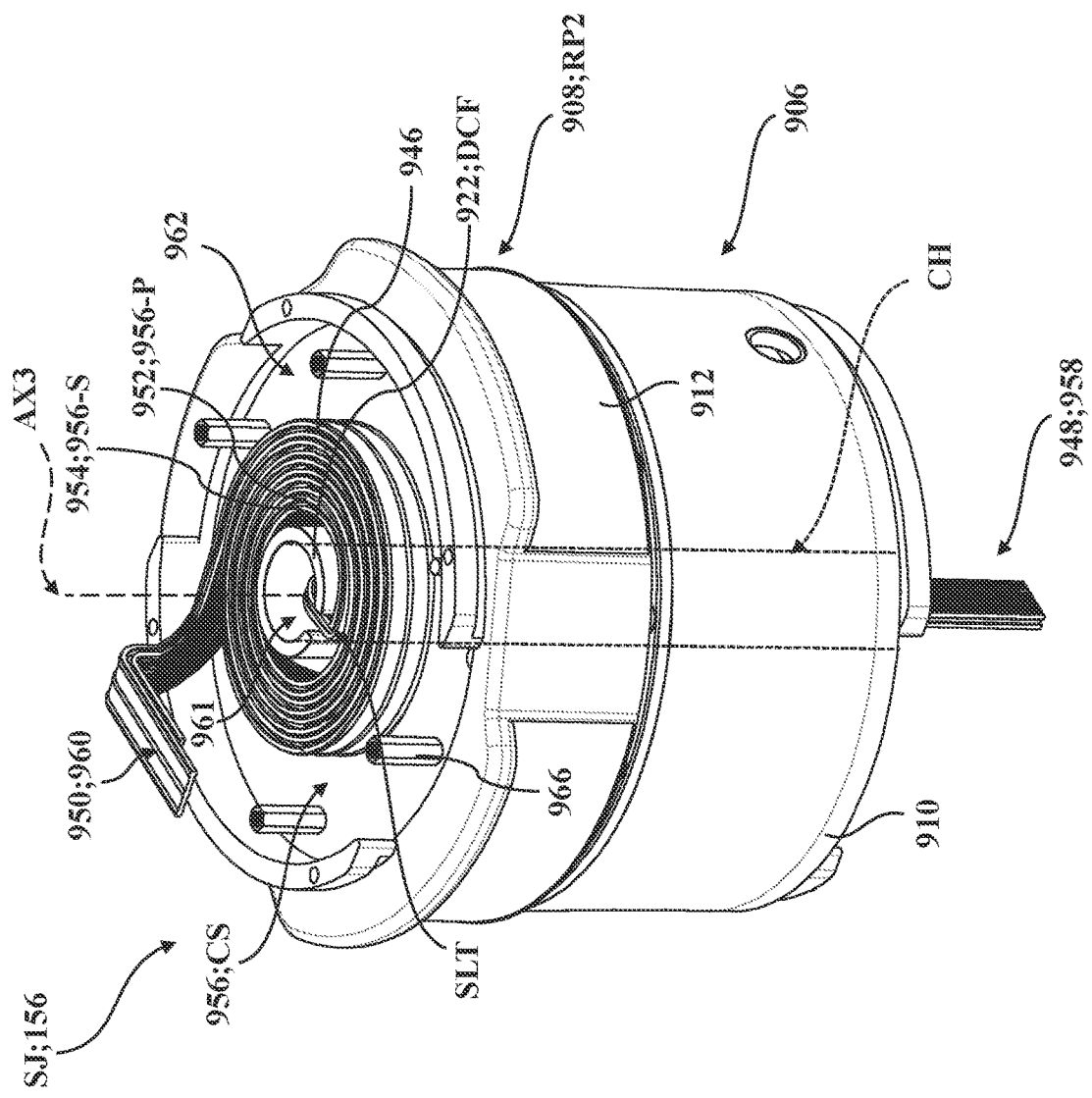
FIG. 12B is a perspective view of the straight joint as shown in FIG. 9, wherein the distal joint subassembly of FIGS. 6A and 6B is shown in a second rotational position, and wherein the printed-circuit board of FIG. 9 is removed.
Figure 13A:
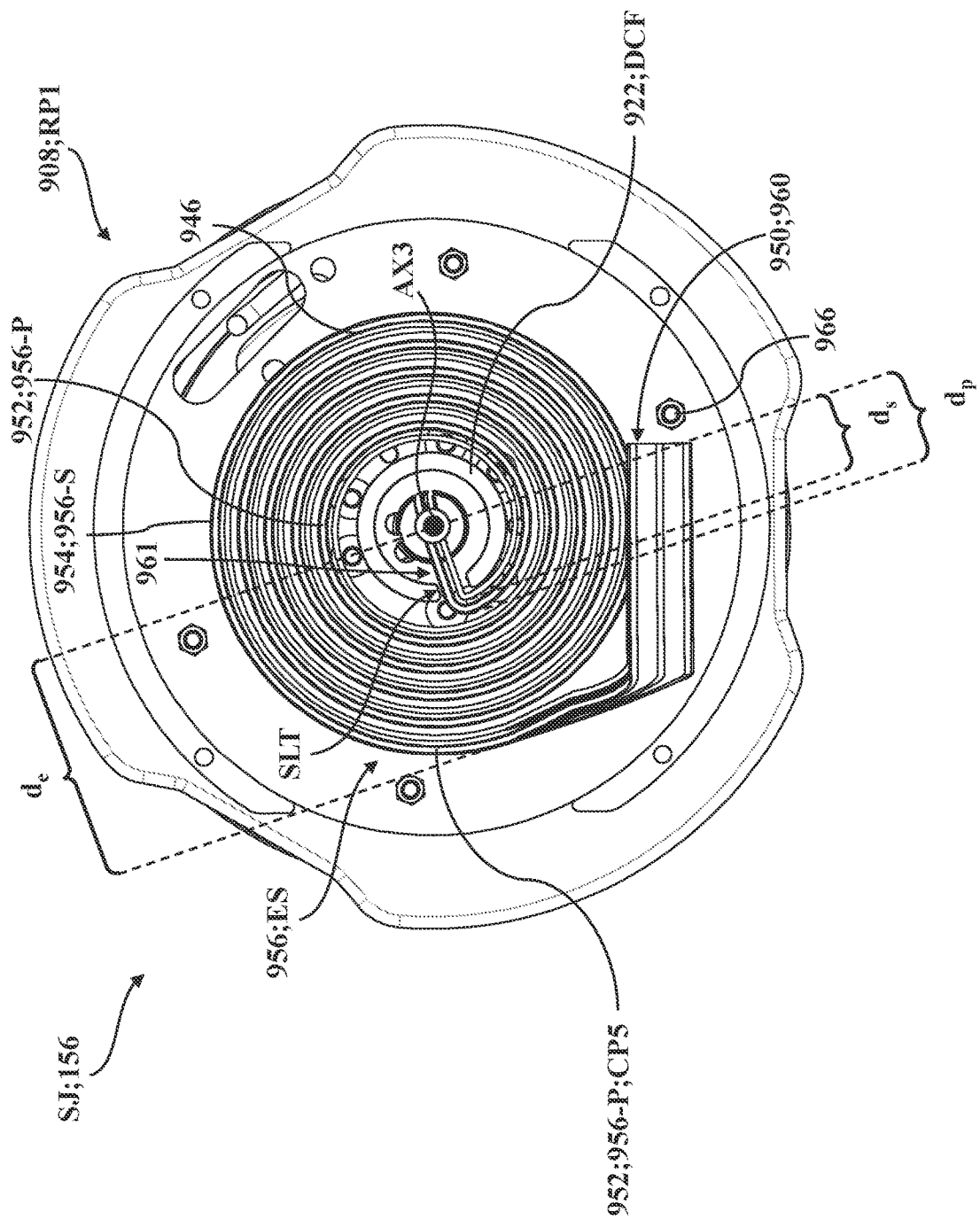
FIG. 13A is a top view of the straight joint as shown in FIG. 12A, wherein the distal joint subassembly of FIGS. 6A and 6B is shown in the first rotational position.
Figure 13B:
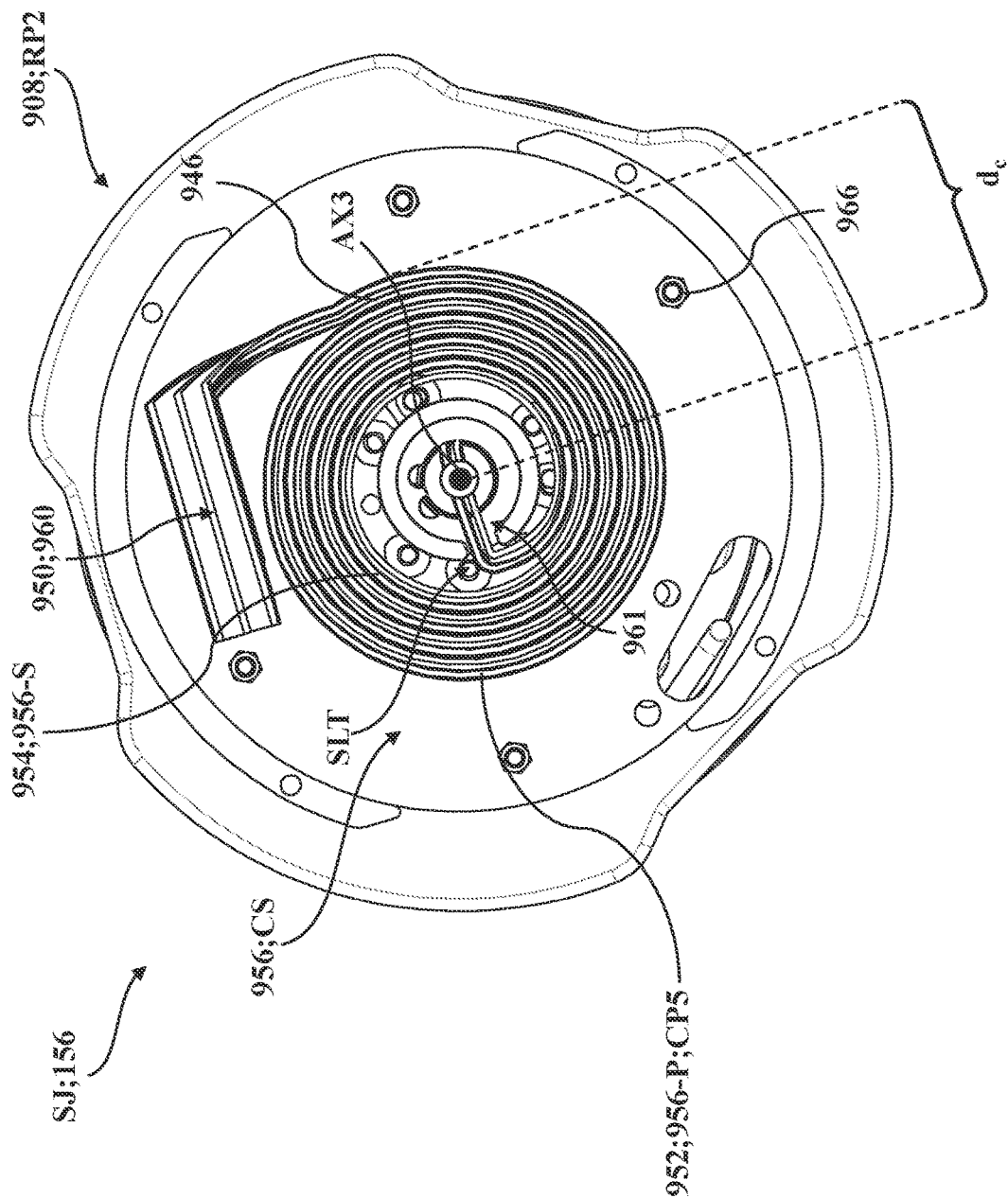
FIG. 13B is a top view of the straight joint as shown in FIG. 12B, wherein the distal joint subassembly of FIGS. 6A and 6B is shown in the second rotational position.

Referring to FIG. 10, the harness assembly 946 includes a spiral region 956, a first runner region 958, a second runner region 960, and an intermediate region 961. More specifically, in the illustrated version, the power harness 952 includes a spiral region 956-P, a first runner region 958-P, a second runner region 960-P, and an intermediate region 961-P; and the signal harness 954 includes a spiral region 954-S, a first runner region 958-S, a second runner region 960-S, and an intermediate region 961-S. As shown in FIG. 10, the spiral region 956 extends in communication between the first harness end 948 and the second harness end 950. As is described in greater detail below, the spiral region 956 is supported for movement between an expanded state ES (see: FIGS. 12A and 13A) and a contracted state CS (see: FIGS. 12B and 13B) to permit rotation of the distal joint subassembly 908 about the axis AX3 between a first radial position RP1 (see: FIGS. 12A and 13A) and a second radial position (see: FIGS. 12B and 13B) while maintaining communication between the proximal interface 934 and the distal interface 936 across the harness assembly 946.

The first runner region 958 is disposed between the first harness end 948 and the spiral region 956, and the second runner region 960 is disposed between the spiral region 956 and the second harness end 950. The intermediate region 961 is defined as the region of the harness assembly 946 between the first runner region 958 and the spiral region 956.

The first runner region 958 is further shown in FIG. 12A as extending parallel to the axis AX3. While the first runner region 958 is shown in FIG. 12A as being substantially straight for illustrative purposes (e.g., with the majority of the first runner region 958 parallel to the axis AX3), in other instances the first runner region 958 may include bends and/or curvatures. As such, at least a portion of the first runner region 958 extends generally parallel to the axis AX3 in some versions.

As is best depicted in FIG. 10, the spiral region 956 includes one or more coils. Specifically, each of the spiral region 956-P of the power harness 952 and the spiral region 956-S of the signal harness 954 includes one or more coils. In the instance of FIG. 10, the spiral region 956-P and the spiral region 956-S each include approximately five coils, with coils CP1, CP5 of the spiral region 956-P and coils CS1, CS5 of the spiral region 956-S labelled for illustrative purposes. In other instances, the spiral region 956-P and the spiral region 956-S may include a greater or lesser number of coils. For instance, the spiral region 956-P and the spiral region 956-S may include a greater or lesser number of coils based on a length of the power harness 952 and the signal harness 954, such as to facilitate different ranges of rotational motion of the joint J about the axis AX3. In this illustrative version, coil CP1 and coil CS1 represent coils of the spiral region 956-P and the spiral region 956-S that are located closest to the axis AX3, while coil CP5 and coil CS5 represent coils of the spiral region 956-P and the spiral region 956-S that are located furthest from the axis AX3. In the instance illustrated herein, coil CP5 surrounds coil CS5 and coil CP1 surrounds coil CS1. In other instances, however, the power harness 952 and the signal harness 954 may be arranged such that coil CS5 surrounds coil CP5 and coil CS1 surrounds coil CP1.

The coils of the spiral region 956-P of the power harness 952 are interposed between the coils of the spiral region 956-S of the signal harness 954. Generally, one or more coils of the spiral region 956-P may be interposed between one or more coils of the spiral region 956-S. For example, in the instance of FIG. 10, five coils of the spiral region 956-P are interposed between five coils of the spiral region 956-S. However, in other instances, a greater or lesser number of coils of the spiral region 956-P may be interposed between a greater or lesser number of coils of the spiral region 956-S. For instance, a greater or lesser number of coils of the spiral region 956-P may be interposed between a greater or lesser number of coils of the spiral region 956-S based on a length of the power harness 952 and the signal harness 954.

As noted above, the channel CH is defined along the axis AX3 and extends in communication between the distal joint subassembly 908 and the proximal joint subassembly 906. As shown in FIG. 12A, the channel CH is configured to receive a portion of the first runner region 958 of the harness assembly 946 such that the portion of the first runner region 958 extends through the channel CH. Referring back to FIG. 6A, the tube 920 of the rotor subassembly 914 at least partially defines the channel CH in the illustrated version. While a portion of the harness assembly 946 extends through the channel CH as shown in FIG. 12A, it will be appreciated that, in other instances, the entire first runner region 958 may extend through the channel CH. Other configurations are contemplated.

In the illustrated version, a pocket 962 shaped to receive the spiral region 956 of the harness assembly 946 is defined by the distal joint subassembly housing 912. As shown in FIG. 12A, the pocket 962 receives the spiral region 956 such that the spiral region 956-P of the power harness 952 and the spiral region 956-S of the signal harness 954 can expand and contract relative to the axis AX3. As is described in greater detail below, in the illustrated version, the tube cap 922 defines a slot SLT through which the intermediate region 961 of the harness assembly 946 is routed between the pocket 962 and the channel CH. With this configuration, it will be appreciated that the spiral region 956-P of the power harness 952 and/or the spiral region 956-S of the signal harness 954 may be received by the pocket 962 such that a center of the spiral region 956-P of the power harness 952 and/or the spiral region 956-S of the signal harness 954 may be at least partially aligned along, with, or relative to the axis AX3. In such instances, the spiral region 956-P of the power harness 952 and/or the spiral region 956-S of the signal harness 954 is partially aligned along the axis AX3 while the spiral region 956 of the harness assembly 946 still surrounds the axis AX3.

In the instance illustrated in FIG. 13A, the power harness 952 and the signal harness 954 are arranged such that a distance $d_p$ from an initial portion the spiral region 956-P of the power harness 952 to the axis AX3 defined adjacent to the slot SLT is greater than a distance $d_s$ from an initial portion of the spiral region 956-S of the signal harness 954 to the axis AX3. However, in other instances, the power harness 952 and the signal harness 954 may be arranged such that a distance $d_s$ from the spiral region 956-S of the signal harness 954 to the axis AX3 is greater than a distance $d_p$ from the spiral region 956-P of the power harness 952 to the axis AX3.

In the illustrated version, the pocket 962 is defined by the distal joint subassembly housing 912. The pocket 962 is shown receiving the spiral region 956 in FIG. 12A. Additionally, referring back to FIG. 6A, the distal joint subassembly includes a riser mount 964, which supports the printed circuit board PCB above the pocket 962. As shown, the riser mount 964 includes posts 966 to couple the riser mount 964 to the distal joint subassembly housing 912. Here, the posts 966 allow a lower surface 968 of the riser mount 964 to be disposed above the pocket 962. Here, the printed circuit board PCB is supported by the riser mount 964 above the pocket 962, and the spiral region 956 is disposed within the pocket 962, while the second harness end 950 remains coupled to the distal interface 936.

As noted above, the distal joint subassembly 908 supports the spiral region 956 for movement between the expanded state ES and the contracted state CS. Here, the pocket 962 of the distal joint subassembly 908 permits movement of the spiral region 956 between the expanded state ES (see: FIGS. 12A and 13A) and the contracted state CS (see: FIGS. 12B and 13B). The pocket 962 provides clearance for the spiral region 956 such that the spiral region 956 may move between the expanded state ES and the contracted state CS when the distal joint subassembly 908 rotates between the first radial position RP1 (see: FIGS. 12A and 13A) and the second radial position RP2 (see: FIGS. 12B and 13B). It will be appreciated that the spiral region 956 may move between the expanded state ES and the contracted state CS while the first harness end 948 maintains communication with the proximal interface 934 and while the second harness end 950 maintains communication with the distal interface 936.

Referring to FIG. 9, the riser mount 964 may also include a keeper 970. As shown in FIG. 9, the keeper 970 is arranged adjacent to the printed circuit board PCB and to the distal interface 936. As shown, the second harness end 950 is operatively attached to the keeper 970 such that a portion of the signal harness 954 is disposed in abutment with the keeper 970 and a portion of the power harness 952 is adjacent to the keeper 970 and disposed in abutment with the signal harness 954. The keeper 970 maintains the arrangement of the power harness 952 and the signal harness 954 and helps facilitate assembly. In the instance illustrated herein, the signal connection interface 944 is closer to the keeper 970 than the power connection interface 942 is to the keeper 970. Furthermore, the signal harness 954 is coupled to the signal connection interface 944 while the power harness 952 is coupled to the power connection interface 942. The keeper 970 organizes the signal harness 954 and the power harness 952 by allowing the power harness 952 to be overlayed onto the signal harness 954, further allowing the signal harness 954 to be coupled to the signal connection interface 944 and the power harness 952 to be coupled to the power connection interface 942 without the signal harness 954 and the power harness 952 becoming tangled. It will be appreciated that, in instances where the power connection interface 942 is located closer to the keeper 970 than the signal connection interface 944, the keeper 970 helps maintain the arrangement of the signal harness 954 and the power harness 952.

As noted above, the tube cap 922 defines the slot SLT, which is configured to receive a portion of the intermediate region 961 to guide the spiral region 956 toward the pocket 962 and to guide the first runner region 958 toward the channel CH. As shown in FIG. 12A, the tube cap 922 protrudes from the distal joint subassembly housing 912 such that the slot SLT is able to receive a portion of the intermediate region 961 and guide the spiral region 956 toward the pocket 962 and guide the first runner region 958 toward the channel CH. Additionally, as shown in FIGS. 12A-13B, during rotation of the distal joint subassembly 908 between the first and second radial position RP1, RP2, the tube cap 922 and the slot SLT do not rotate with the distal joint subassembly 908. As such, during rotation of the distal joint subassembly, the slot SLT is configured to receive a portion of the intermediate region 961 to confine the spiral region 956 within the pocket 962 and to confine the first runner region 958 within the channel CH such that the spiral region 956 does not move into the channel CH and the first runner region 958 does not move into the pocket 962. It will be appreciated that the slot SLT further promotes routing and organization of the harness assembly 946, and helps maintain communication between the proximal interface 934 and the distal interface 936.

As noted above, the proximal joint subassembly 906 is configured to support the distal joint subassembly 908 for rotation about an axis AX3, including between the first radial position RP1 of the distal joint subassembly 908 shown in FIGS. 12A and 13A and the second radial position RP2 of the distal joint subassembly 908 shown in FIGS. 12B and 13B, as well as to other radial positions beyond or between first first radial position RP1 and the second radial position RP2. The first and second radial positions RP1, RP2 may be defined based on a desired rotational range of the distal joint subassembly 908 that can be utilized during operation. The first and second radial positions RP1, RP2 may also be based on a desired range of motion of the end effector 164. In the illustrated version, the spiral region 956 is in the expanded state ES when the distal joint subassembly 908 is in the first radial position RP1, and the spiral region 956 is in the contracted state CS when the distal joint subassembly is in the second radial position RP2.

As shown in FIGS. 12A-13B, the spiral region 956 is arranged closer to the axis AX3 in the contracted state CS than in the expanded state ES because of, among other things, how the harness assembly 946 is wound. For example, as shown in FIGS. 13A and 13B, a distance $d_e$ (shown in FIG. 13A) between coil CP5 of the power harness 952 and the axis AX3 in the expanded state ES may be greater than the distance $d_c$ (shown in FIG. 13B) between coil CP5 of the power harness 952 and the axis AX3 in the contracted state CS. As another example, as shown in FIGS. 13A and 13B, a distance between a coil of the power harness 952 and an adjacent coil of the signal harness 954 in the expanded state ES may be greater than a distance between the coil of the power harness 952 and the adjacent coil of the signal harness 954.

It will be appreciated that movement of the spiral region 956 between the expanded state ES and the contracted state CS prevents the spiral region 956 from becoming tangled during rotation of the distal joint subassembly 908. Specifically, during rotation of the distal joint subassembly 908 between the first radial position RP1 and the second radial position RP2, the spiral region 956 moves between the expanded state ES and the contracted state CS without becoming tangled, thereby significantly mitigating the risk of otherwise potentially disconnecting either the first harness end 948 from the proximal interface 934 and/or the second harness end 950 from the distal interface 936. In this way, movement of the spiral region 956 between the expanded state ES and the contracted state CS permits rotation of the distal joint subassembly 908 about the axis AX3 between the first radial position RP1 and the second radial position RP2 while maintaining communication between the proximal interface 934 and the distal interface 936 across the harness assembly 946.

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention claimed is:

1. A robotic surgical system comprising:
a navigation system to track a position and orientation of one or more objects within a coordinate system; and
a robotic arm defining an end movable relative to a support structure, with the robotic arm being configured to maintain alignment of the end relative to a target position of a patient's body defined within the coordinate system, the robotic arm including:
a plurality of joints coupled between the support structure and the end, with one of the joints including:
a distal joint subassembly, and
a proximal joint subassembly supporting the distal joint subassembly for rotation about an axis between a first radial position and a second radial position, with a channel defined along the axis and extending in communication between the distal joint subassembly and the proximal joint subassembly;
a distal joint module including a distal interface;
a proximal joint module including a proximal interface; and
a harness assembly having a first harness end coupled to the proximal interface, a second harness end coupled to the distal interface, and a spiral region extending in communication between the first harness end and the second harness end, the spiral region being supported for movement between an expanded state and a contracted state to permit rotation of the distal joint subassembly about the axis between the first radial position and the second radial position while maintaining communication between the proximal interface and the distal interface across the harness assembly.

2. The robotic surgical system of claim 1, wherein the spiral region is in the expanded state when the distal joint subassembly is in the first radial position when the spiral region is in the expanded state, and wherein the spiral region is in the contracted state when the distal joint subassembly is in the second radial position.

3. The robotic surgical system of claim 1, wherein the harness assembly includes one or more wires extending in electrical communication between the proximal interface and the distal interface.

4. The robotic surgical system of claim 1, wherein the harness assembly includes a power harness for transmitting power and a signal harness for transmitting data.

5. The robotic surgical system of claim 4 further comprising:
a motor coupled to the power harness, the motor configured to rotate the distal joint subassembly in response to receiving power from the power harness; and
an encoder coupled to the signal harness, the encoder being configured to sense a position of the distal joint subassembly and transmit the position of the distal joint subassembly via the signal harness.

6. The robotic surgical system of claim 4, wherein the proximal interface and the distal interface each include a power connection interface and a signal connection interface, the power harness being coupled to the power connection interface of the proximal interface and the power connection interface of the distal interface, and the signal harness being coupled to the signal connection interface of the proximal interface and the signal connection interface of the distal interface.

7. The robotic surgical system of claim 4, wherein the spiral region of the power harness and the spiral region of the signal harness are at least partially aligned along the axis with one or more coils of the spiral region of the power harness interposed between one or more coils of the spiral region of the signal harness.

8. The robotic surgical system of claim 4, wherein a distance from one of the spiral region of the power harness and the spiral region of the signal harness to the axis is greater than a distance from the other of the spiral region of the power harness and the spiral region of the signal harness to the axis.

9. The robotic surgical system of claim 1, wherein the spiral region surrounds the axis, the spiral region being arranged closer to the axis in the contracted state than in the expanded state.

10. The robotic surgical system of claim 9, wherein the harness assembly includes a first runner region disposed between the first harness end and the spiral region and a second runner region disposed between the spiral region and the second harness end.

11. The robotic surgical system of claim 10, wherein at least a portion of the first runner region extends generally parallel to the axis.

12. The robotic surgical system of claim 10, wherein at least a portion of the first runner region extends through the channel.

13. The robotic surgical system of claim 10, wherein the second runner region is coupled to a portion of the distal joint subassembly.

14. The robotic surgical system of claim 4, wherein the distal joint subassembly defines a pocket shaped to receive the spiral region and to permit movement of the spiral region between the expanded state and the contracted state.

15. The robotic surgical system of claim 14, wherein the robotic surgical system includes a printed circuit board coupled to the distal joint subassembly, the printed circuit board being disposed above the pocket.

16. The robotic surgical system of claim 15, wherein the distal joint subassembly includes a riser mount supporting the printed circuit board above to the pocket.

17. The robotic surgical system of claim 16, wherein the riser mount includes a keeper arranged adjacent to the printed circuit board; and
   wherein the second harness end of the harness assembly is operatively attached to the keeper of the riser mount.

18. The robotic surgical system of claim 17, wherein at least a portion of the signal harness is disposed in abutment with the keeper, and wherein at least a portion of the power harness is adjacent to the keeper and disposed in abutment with the signal harness.

19. The robotic surgical system of claim 1, further comprising an imaging device having a gantry to obtain image data of a patient positioned therein, the support structure being operatively attached to the gantry.

\* \* \* \* \*